US006898156B1

(12) United States Patent
Nakamiya et al.

(10) Patent No.: US 6,898,156 B1
(45) Date of Patent: May 24, 2005

(54) ELECTRONIC TIMEPIECE WITH CHECKING FUNCTION AND ITS CHECKING METHOD

(75) Inventors: Shinji Nakamiya, Matsumoto (JP); Katsuyoshi Takahashi, Hotaka-machi (JP)

(73) Assignee: Seiko Epson Corporation, Tokyo (JP)

( * ) Notice: Subject to any disclaimer, the term of this patent is extended or adjusted under 35 U.S.C. 154(b) by 884 days.

(21) Appl. No.: 09/717,426

(22) Filed: Nov. 20, 2000

(30) Foreign Application Priority Data

Nov. 24, 1999 (JP) .......................................... 11-333525

(51) Int. Cl.[7] .............................. G04C 3/00; H02J 7/00

(52) U.S. Cl. ....................... 368/204; 368/203; 320/135; 340/636.15

(58) Field of Search ................................ 368/203, 204; 320/132–136; 340/636.15, 636.1

(56) References Cited

U.S. PATENT DOCUMENTS 3,894,278 A * 7/1975 Gerum .................. 340/636.15
4,017,724 A * 4/1977 Finger ......................... 702/63
4,758,772 A * 7/1988 Lang .......................... 320/136
4,950,913 A * 8/1990 Kephart ...................... 307/10.7
5,343,137 A * 8/1994 Kitaoka et al. ............. 320/132
5,475,654 A * 12/1995 Furumura et al. ............ 368/10

FOREIGN PATENT DOCUMENTS

| | | |
|---|---|---|
| CH | 642 812 G | 5/1984 |
| CN | 87 2 01161 U | 11/1987 |
| CN | 2171883 Y | 7/1994 |
| EP | 0886 197 | 12/1998 |
| JP | 57-24586 | 2/1982 |
| JP | 62-239083 | 10/1987 |
| JP | 1-107186 | 4/1989 |
| JP | 8-233958 | 9/1996 |
| JP | 09-326498 | 12/1997 |
| JP | 11-52035 | 2/1999 |
| JP | 11-295450 | 10/1999 |

* cited by examiner

*Primary Examiner*—David Martin
*Assistant Examiner*—Jeanne-Marguerite Goodwin
(74) *Attorney, Agent, or Firm*—Rosalio Haro

(57) ABSTRACT

An electrical timepiece comprises external input units for receiving an external input signal, a motor unit for driving an analog hand unit for displaying time, a battery unit capable of charging, a voltage detect circuit for measuring the voltage of the stored electricity in the battery and comparing the voltage with a reference voltage, and a stored electricity unit discharge control circuit for starting discharge from the battery when an external input signal is received by one of the external input unit, and for stopping discharge from the battery when the comparison result by the voltage detect circuit satisfies a prescribed condition.

24 Claims, 15 Drawing Sheets

ELECTRONIC TIMEPIECE WITH CHECKING FUNCTION AND ITS CHECKING METHOD

BACKGROUND OF THE INVENTION

1. Field of the Invention

This invention relates to electronic timepiece operating by the power supply of chargeable battery, and to checking method for the timepiece.

2. Description of the Related Art

There are a variety of portable electronic timepieces such as wristwatches and electrical clocks. Some of these timepieces have chargeable power source such as chargeable batteries or large-capacitance capacitors. And in some others, battery units are constructed as removable unit. In these timepieces, time-keeping units and digital (or analog) displaying units for displaying time conduct operation by using the electrical power stored on the batteries.

FIG. 11 shows a flowchart showing one example of manufacturing process and checking process for timepiece with battery and charging means for the battery.

As for FIG. 11, discharging step (step A101) is done before manufacturing electrical timepiece.

In this discharging step, by using an external discharging circuit, for example as shown in FIG. 12, the battery is discharged alone. In the external discharging circuit 100 shown in FIG. 12, a plurality of (n piece of) batteries from BA1 to BAn are placed on a battery placing section 101. Each battery from BA1 to BAn is connected in series to a resister from R1 to Rn respectively. A sink type constant voltage power source 102 is connected in parallel to each of the above series-connected resisters and batteries. By the above configured external discharging circuit 100, batteries from BA1 to BAn are discharged at the same time. In this case, the number of installation terminals for the batteries in the external discharging circuit 100 have to be enough for the number of batteries discharged at the same time.

After this battery discharging step (step A101), an assembling step (step A102) and an exterior installation step (step A103) is conducted. Then a battery charging step (step A104) is conducted.

In this charging step, quality of charging function of the battery is examined, and enough electrical energy for the electrical timepiece operation in the next step of an operation checking step (step A105) is stored in the battery. Charging is conducted in the following way. For example, for a timepiece with a rotating type generator, giving a vibration to the timepiece moves an oscillation weight in the rotating type generator of the timepiece. A kinetic energy generated in the oscillation weight in this process is converted by the generator into electrical energy, and then the electrical energy is stored in the battery. And in other type of timepiece such as with solar panel, generation is conducted by the solar panel, and the generated electrical energy is stored in the battery. And yet in other type of timepiece, it is possible to use for generation an inductive energy in accordance with an exterior radio wave or a magnetic force, and to charge the battery.

Confirmation of a charging state is conducted in the following way. In the charging step, an operator puts a charging state display function into action, the charging state display function being installed in the timepiece. And the operator checks the displaying state of the timepiece, and confirms whether or not the charging the battery is over.

The battery discharging step (step A101) mentioned above is done in order to, at this charging step, control an accuracy of battery voltage inspection within a certain range.

In the operation checking step (step A105), a quality verification for the electrical timepiece is conducted. This quality verification comprises timepiece operation verification in high and cold temperature. In detail, in the operation checking step, at around 60 degree centigrade of high temperature atmosphere and around minus 10 degree centigrade of low temperature atmosphere, a trial operation extending several hours or several tens of hours is conducted. In this trial operation period, a stoppage and a delay of time display is checked. And by confirming a continuous discharging time of the battery after the trial operation, a quality confirmation (judgment) is conducted.

After the operation checking step, a shipment checking step (step A106) with an exterior checking and a full-charging step (step A107) to full-charge the battery is conducted, then the timepiece is shipped (step A108).

Incidentally, in the battery discharging step explained above, discharging the battery is conducted alone by using the external discharging circuit before the assembling. And discharging time requires from several to several tens of hours. Therefore, discharging circuit facility with enough number of, for example enough for one day production of timepiece, installation terminals for the batteries is necessary. Hence, this discharging method is not appropriate for a model produced on a massive scale.

And if, for example, after the shipment, an operation verification for discharging function is required, it is very difficult for the battery to be made on a certain discharging state without a discharging facility.

Moreover, there are several kind of battery. Even among lithium type battery, discharging character differs, for example, according to types of electrode as shown in FIG. 13. And chargeable battery has a characteristic of voltage recovery effect by which, after stopping discharging, voltage rises. Therefore battery voltage is unstable and becomes wide after discharging. This voltage dispersion after discharging causes a disadvantageous effect on the checking accuracy.

And in the charging step, for example, a charging state such as charging voltage is displayed by the amount of fast-forwarding movement of the analog second hand on the displaying section, by pushing a certain switch. In this case, external operation such as pushing a certain switch or the like is necessary to confirm the charging state. Hence an external input is required, and resulting in a problem of more operation process. And since confirmation is done by the amount of fast-forwarding movement of the analog second hand, if the amount of fast-forwarding movement is wrongly recognized, there is a possibility that checking result falls in a fault judgment.

And in the operation checking step, the quality verification for the electrical timepiece is conducted by checking the operation under a high and low temperature atmosphere. More precisely, by checking whether or not there is a stoppage (continuous time-keeping trouble) or a delay under the above condition, the quality verification of the timepiece is conducted. Therefore even when the trouble is detected in the timepiece, it is difficult to identify the cause of the trouble whether it is due to the motor drive unit or due to the battery.

In order to confirm that it is due to a motor drive trouble, it is required to examine even a gear train unit for driving hour, minute and second hand. And in order to do this examination, it is required to break the timepiece up by considerably fine detail. Hence, in order to prevent this complicated breaking up work and examination, there is a demand that distinction between the motor drive trouble and other factor be made as easy as possible. However, in the prior arts timepiece, it is difficult to make a distinction between the motor drive trouble and other factor.

And as for the motor drive trouble, as long as the motor is not apparently low quality, it is not possible to judge that the trouble is due to the motor. But, for example, there is somewhat low quality motor which under some temperature condition works and does not cause a delay. Ideally, this kind of motors should also be judged as motor problem. However it is difficult to make such a judgement.

By taking the above situation into considering, the object of the present invention is to provide an electrical timepiece with a checking function which, for example, in the timepiece manufacturing process enhances the checking accuracy and efficiency, and a checking method for the timepiece.

OBJECTS OF THE INVENTION

Therefore, it is an object of the present invention to overcome the aforementioned problems.

SUMMARY OF THE INVENTION

In order to solve the above problems, in the present invention, a timepiece comprises an external input unit for receiving an external signal, a display section for displaying the time, a battery unit capable of charging, a drive unit for driving the display section by the electrical power stored in the battery unit, a comparator unit, and a discharging control unit. The comparator unit detects a voltage of the battery unit, and compares the voltage with a reference voltage. The discharging control unit, when, via the external input terminal, a prescribed signal enters, starts discharging from the battery unit, and when the detected result by the comparator unit satisfies a prescribed condition, stops the discharging from the battery unit.

By the present invention, it is possible to provide following advantages. Being able to check the timepiece operation more accurately and efficiently. Unnecessity of an external circuit for discharging the battery in the manufacturing process. Being able to lower the voltage dispersion of the battery after and before charging.

DESCRIPTION OF THE PREFERRED EMBODIMENTS

Figure 1:
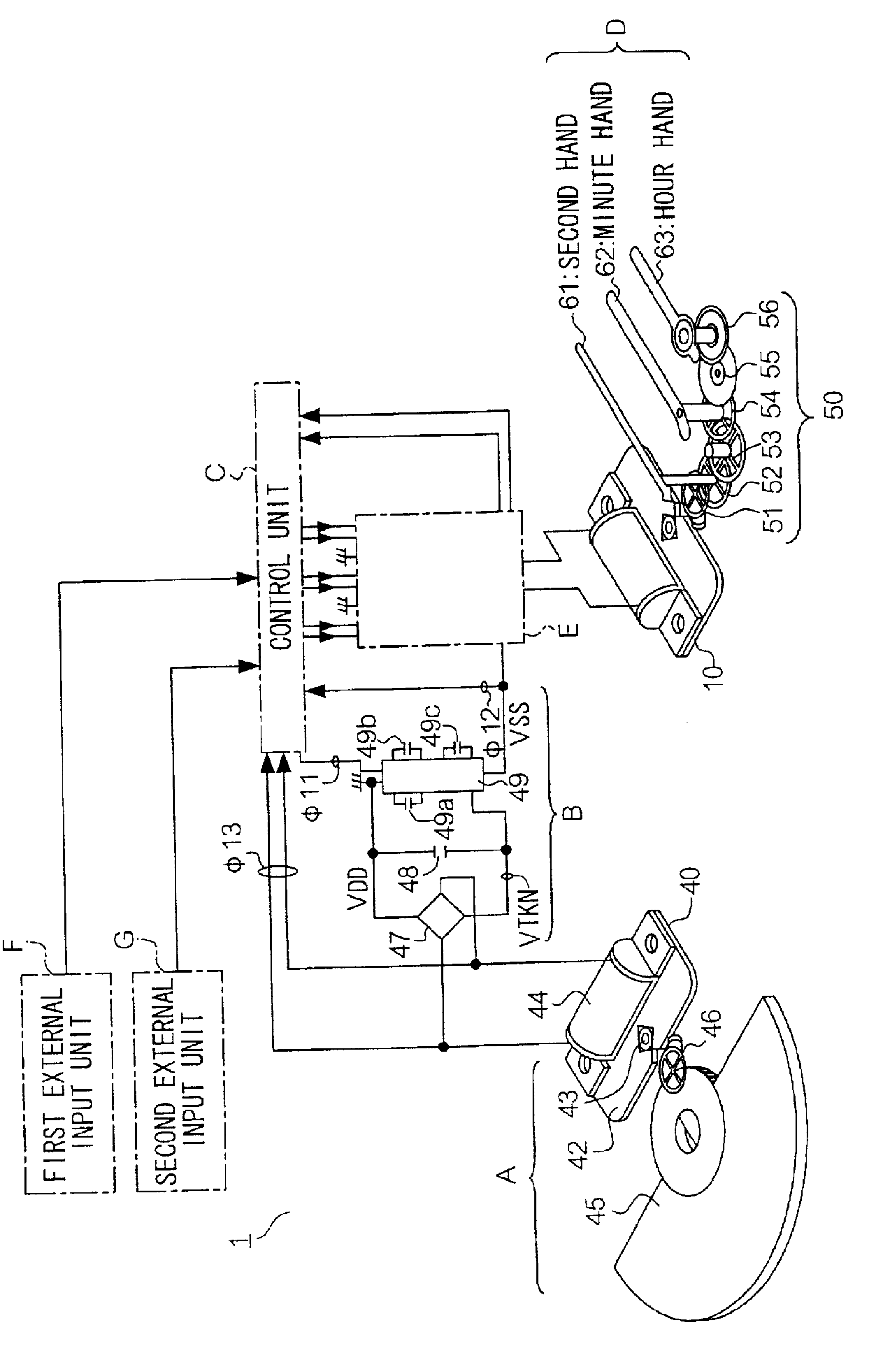
FIG. 1 is a block diagram showing a construction of the timepiece of one embodiment of the present invention.

From here, by using drawings, one embodiment of present invention will be described. FIG. 1 is a block diagram which shows a construction of the timepiece 1 of one embodiment of the present invention. In FIG. 1, the timepiece 1 is a wristwatch. User of this wristwatch wears it by using a belt attached to the apparatus. The electrical timepiece 1 comprises a generator system A, a power supply system B, a control unit C, a motor unit D, a motor drive circuit E, a first external input terminal F, and a second external input terminal G. Brief explanations of these parts are as follows. The generator system A generates alternating current. The power supply system B rectifies the alternating current, then stores the generated energy into the battery unit 48, and then raises or lowers the stored voltage, and then supplies the electricity to each constructing parts. The control unit C controls the entire timepiece 1. The motor unit D comprises a second hand 61, a minute hand 62, a hour hand 63, and a stepping motor 10 for the hands. The motor drive circuit E is a circuit for driving the stepping motor 10 in the motor unit D, based on a control signal from the control unit C. The first external input unit F and the second external input unit G are means for changing a checking mode process in turn. This operation check function is one feature of the timepiece 1 of the present invention.

The generator system A comprises a generating apparatus 40, an oscillating weight 45, an acceleration gear 46. The generating apparatus 40 in FIG. 1 is an electromagnetic induction type AC generator apparatus. The electromagnetic induction type AC generator apparatus comprises a generator rotor 43, a generator stator 42, and a generator coil 44. The oscillating weight 45 is a means for providing the generator rotor 43 with an energy. In this wristwatch type electrical timepiece 1, the oscillating weight 45 is driven to rotate by movement of user's arm. The movement of the oscillating weight 45, via the acceleration gear 46, is transmitted to a generator rotor 43. Then the generator rotor 43 rotates in a generator stator 42. Then voltage is induced in the generator coil 44. The voltage is output to between two output terminals of the generator coil 44. In this way, in the generator system A, generation is done by use of energy related to user's everyday life.

The power supply system B comprises a rectifier circuit 47, a battery (a battery unit) 48 and a voltage raising and lowering circuit 49. The alternating voltage from the generator system A is rectified by the rectifier circuit 47 into a direct voltage, and is stored in the battery (the battery unit) 48. The battery unit 48 comprises a large-capacitance capacitor or a chargeable battery such as lithium battery. The direct voltage stored in the battery 48 is supplied to the voltage raising and lowering circuit 49. The voltage raising and lowering circuit 49 is a circuit for, by using more than one capacitors of from 49*a* to 49*c*, raising or lowering the direct voltage multiple times. The output voltage of the voltage raising and lowering circuit 49 is controllable by a control signal ϕ11 from the control unit C.

In the structure shown in FIG. 1, a voltage VDD of higher electric potential side of the battery 48 (higher electric potential side voltage) is described as a reference electric potential GND. And a lower electric potential side voltage of the battery 48 is described as a VTKN (a first lower electric potential side voltage). And a lower electric potential side voltage of the raising and lowering circuit 49 is described as a second lower electric potential side voltage VSS. Output voltage of the generator coil 44 is input to the control unit C as a control signal ϕ13. A voltage value of voltage VSS is input to the control unit C as a control signal ϕ12.

A motor drive circuit E creates a drive pulse based on a drive clock supplied from the control unit C, and then provides the drive pulse to a stepping motor 10 in the motor unit D. The stepping motor 10 comprises a rotator section. The rotator section rotates a fixed degree when the drive pulse is supplied to the stepping motor 10. The rotation of the rotating part of the stepping motor 10 is transmitted to the second hand 61 by way of a second intermediate wheel 51 and a second wheel 52, both wheel being connected to the rotating part. Then the second hand rotates, and the second indication is conducted. And the rotation of the second wheel 52 is transmitted to a minute intermediate wheel 53, a minute wheel 54, an hour intermediate wheel 55, and an hour wheel 56. The minute wheel 54 is connected to a minute hand 62. The hour wheel 56 is connected to a hour hand 63. Therefore these hands works together with the rotation of the stepping motor 10. And hour and minute indications are conducted.

Although not described in the drawings, it is possible to connect other transmission system to the gear train 50 which is constructed by wheels from 51 to 56 in order to display a calendar and so on. For example, in order to display a date, it is possible to put a cylindrical intermediate wheel, an intermediate date wheel, and a date wheel and so on. And still, it is possible to put a calendar correction gear train (such as a first calendar correction wheel, a second calendar correction wheel, a calendar correction wheel, and a date disc).

The first external input unit F comprises a crown for time setting and a circuit for detecting the time-setting operation electrically. In this embodiment, the second external input unit G is used as a switch for starting the operation check function the timepiece 1 has. The second external input terminal G is an indicator switch installed on the exterior section of the wristwatch. The second external input terminal G is used when confirming the charging state of the battery 48. And also in this embodiment, the second external input terminal G is used as a switch for inputting a signal to change modes of from 1 to 3 while operating the operation check process (B100). Operation state of the first external input unit F and the second external input unit G is input to the control unit C in electrical signal.

Figure 2:
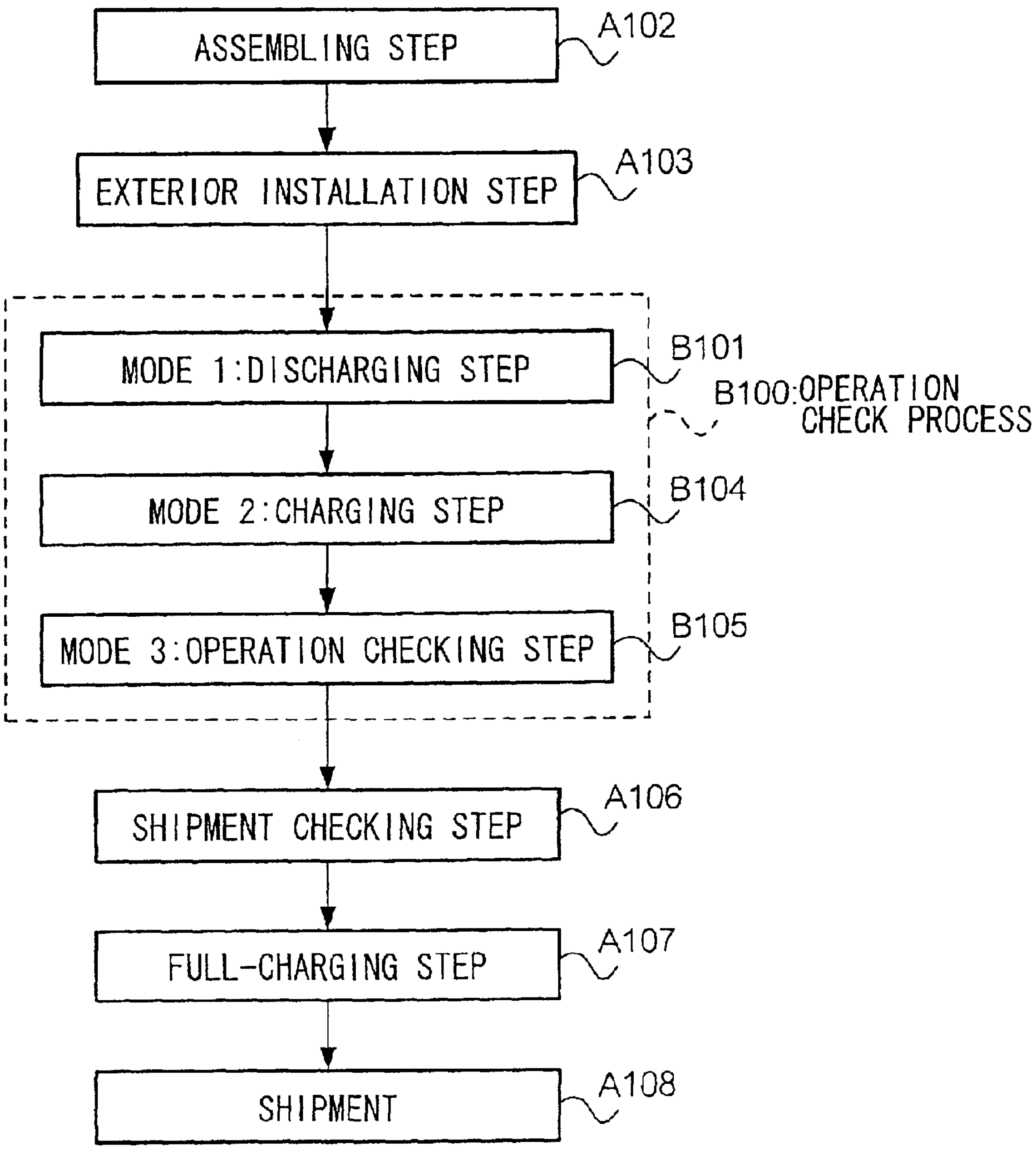
FIG. 2 is a flowchart showing a flow of manufacturing and checking process of the timepiece.

Here, by referring to FIG. 2, an outline of the operation check process realized in this embodiment will be described. FIG. 2 is a flowchart showing an example of manufacturing and checking process of the electrical timepiece of the present embodiment. The operation check process B100 is conducted after the manufacturing process (step A102) and the exterior installation process (step A103). The operation check process B100 is composed of three processes (step B101, step B104, and step B105). These three processes is conducted by using each function of modes from 1 to 3 which the timepiece has in itself.

Figure 11:
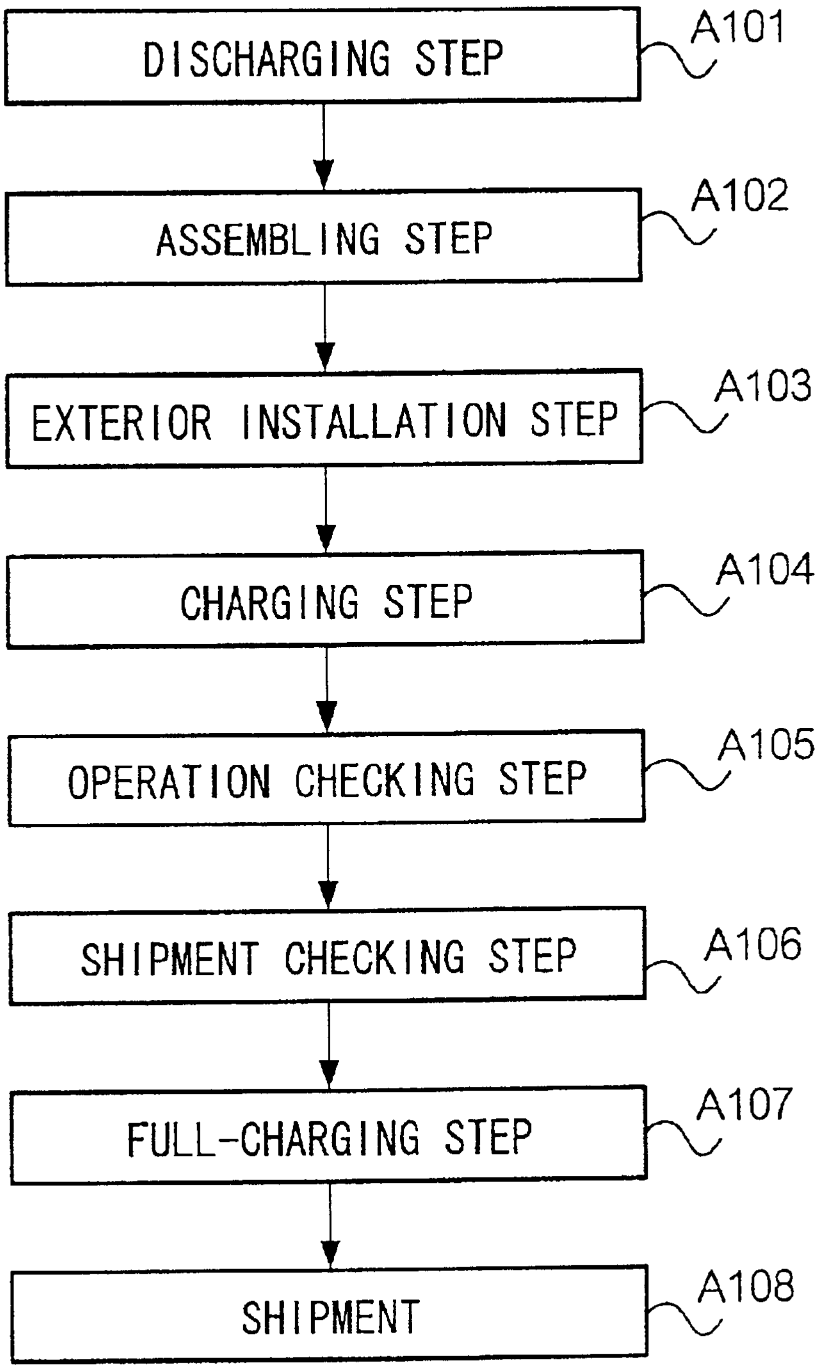
FIG. 11 is a flowchart showing an operation and checking process of the timepiece of prior arts.
Figure 12:
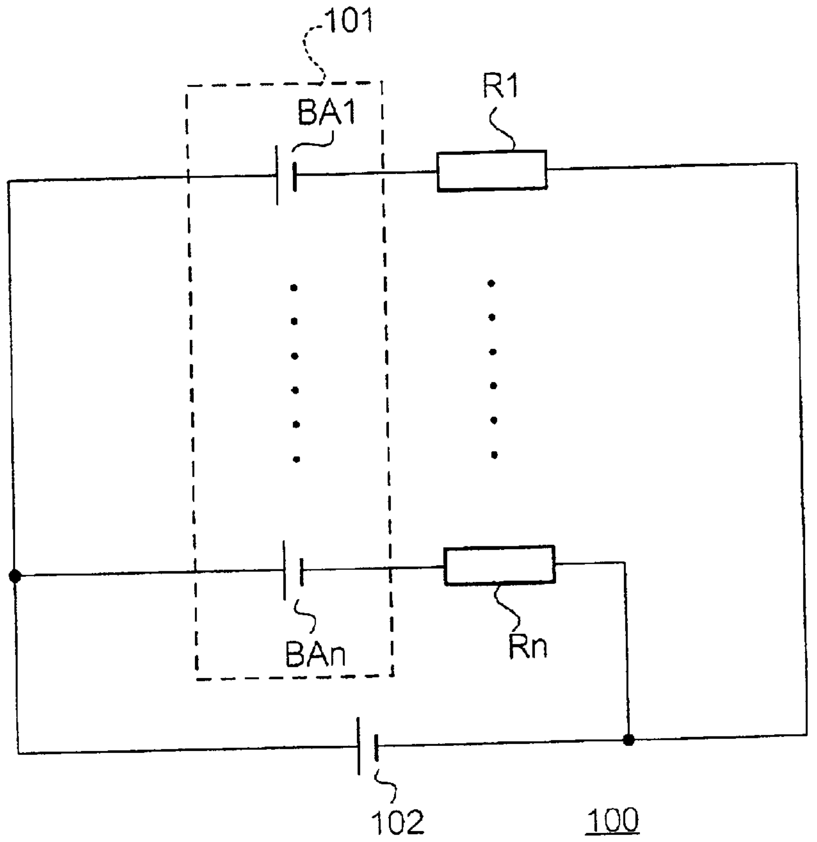
FIG. 12 is a circuit showing an external discharging circuit of prior arts for batteries.
Figure 13:
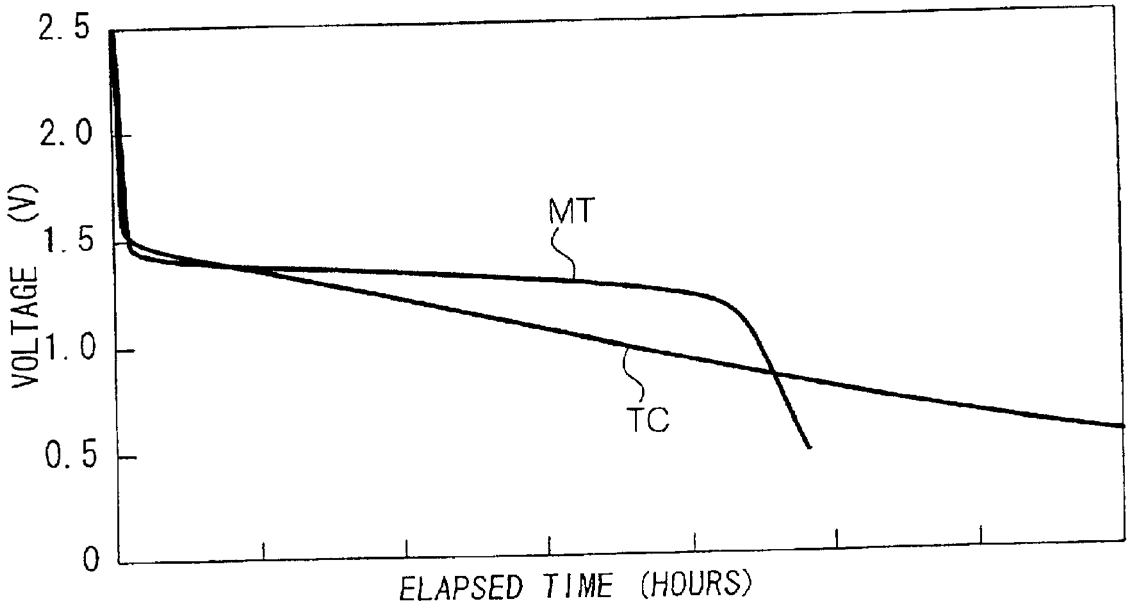
FIG. 13 is a diagram showing discharging characteristics of two types of lithium chargeable battery (MT: which uses manganese and titanium for electrode, CT: which uses titanium and carbon for electrode).

The first process (step B101) of the operation check process B100 is corresponding to discharging step A101 in FIG. 11. The first process is conducted as a preparation process for checking the charging function of the timepiece 1. In the first process, by mode 2 function of the timepiece 1, an electrical power consumption circuit is put to start, and the electrical power consumption circuit discharges electrical charge stored in the battery 48, and thereby the voltage of the battery is controlled into a prescribed voltage.

The second process (step B104) of the operation check process B100 is a process for judging a quality of charging performance. The second process is conducted by mode 2 function of the timepiece 1 (charging performance quality judge function). In more details, in this second process, the electrical timepiece 1 is supplied with a vibration, and thereby the oscillating weight in it is driven to rotate. Therefore electricity is generated in the generator system A, and charging the battery 48 is done. Then, by the mode 2 function (charging performance quality judge function), whether or not the battery voltage reaches charging completion voltage within a prescribed charging period is judged, and result of judgement is displayed to the user by movement of second hand 61.

The third process (step B105) of the operation check process B100 is a process for poor quality detection by operating the timepiece 1. In more details, in this third process, under high or low temperature condition, although being able to rotate the stepping motor 10, irregular motor drive pulse which will result in more electrical power consumption is generated from the motor drive circuit E. Operation under this kind of severe condition enables to detect motor characteristic trouble which is not possible to detect under normal motor drive pulse. When the trouble is detected, movement of, for example, the second hand 61 is changed from a normal state to other state, and the state is continued. The user sees that the movement of second hand is different from normal state, and knows the motor characteristics has some trouble.

Figure 3:
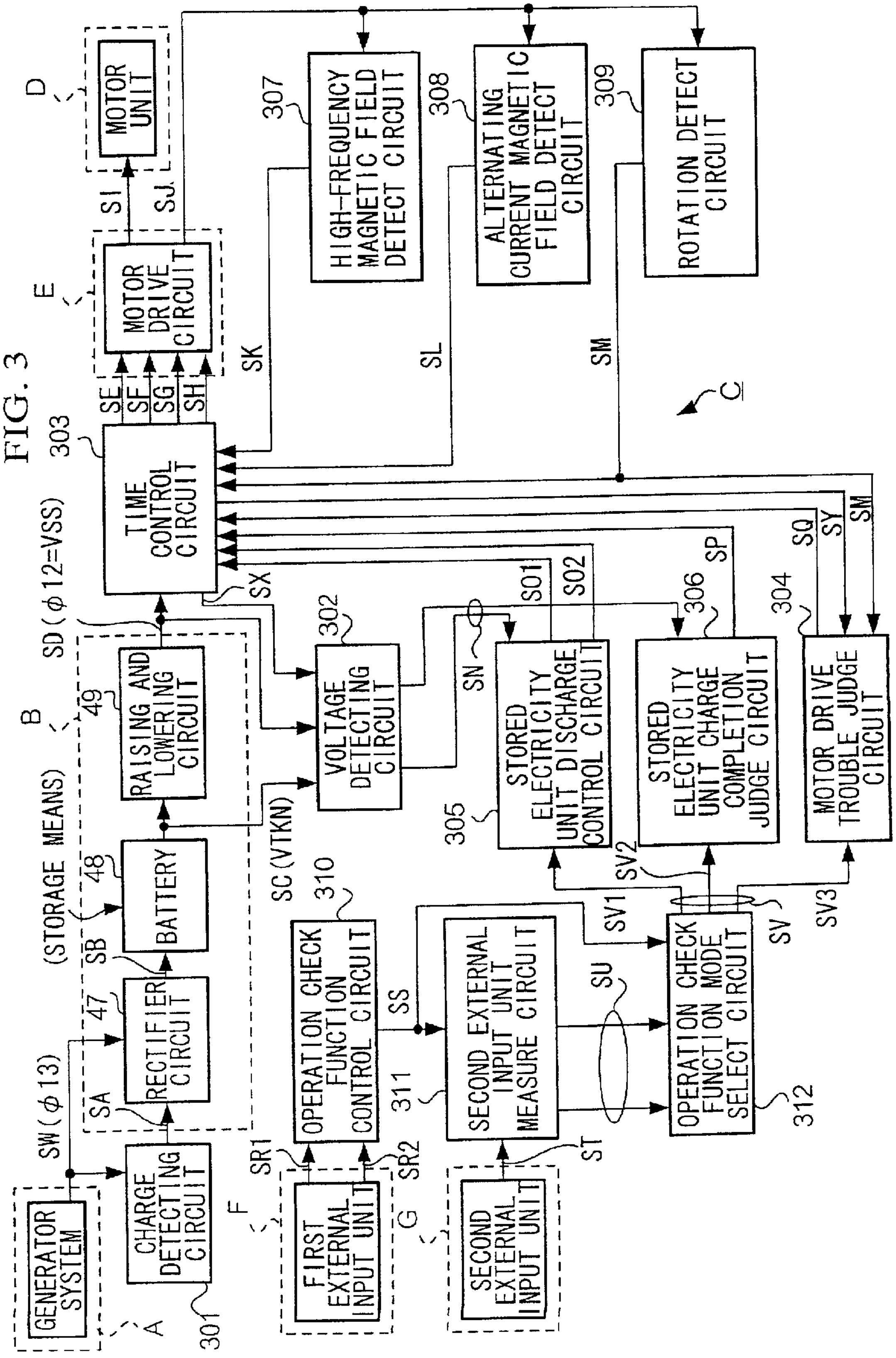
FIG. 3 is a block diagram showing constructions of each part of the timepiece.

Next, by using FIGS. 3 to 8, details of each construction of the timepiece 1 shown FIG. 1 will be described. FIG. 3 is a block diagram showing detail of the construction of the control unit C, and signal flows between units of from A to G. In FIG. 3, blocks of from 301 to 312 are circuit blocks in the control unit C, and those surrounded by broken lines are not.

The charge detecting circuit 301 receives the output voltage of the generator coil 44 as a generation voltage signal SW (ϕ13), and, by the signal, detects a generation state of the generator system A. And then the circuit 301 outputs the result showing a detection result of the charging state as a charge detect result signal SA. The signal SA which enters into the rectifier circuit 47 in the power supply system B is used as a signal for controlling a rectification operation. Rectified output of the rectifier circuit 47 is supplied to the battery (the battery unit) 48 as a rectification output signal SB. And a stored voltage signal SC showing the stored voltage (=VKTN) of battery 48 enters into a raising and lowering circuit 49 and a voltage detecting circuit 302.

The voltage detecting circuit 302 receives the stored voltage signal SC, a stored voltage raising and lowering result signal SD (ϕ12=VSS), and a voltage detect control signal SX. The stored voltage raising and lowering result signal SD is a signal indicating the output voltage of the raising and lowering circuit 49. The voltage detect control signal SX is output from a timepiece control circuit 303. The voltage detecting circuit 302, when the voltage detect control signal SX is active, compares the signal SC of indicating the stored voltage VKTN with predetermined comparison voltages of DCHRGV and CHRGV respectively, then outputs a voltage detect result signal SN comprised of bits SN1 and SN2 indicating respective comparison results.

Incidentally, other than direct comparison between the stored voltage VTKN and the comparison voltages, it is possible to compares, instead of the stored voltage VTKN, the raising and lowering voltage VSS with the voltages of DCHRGV and CHRGV, and then outputs the voltage detect result signal SN.

For example, when the raising and lowering circuit 49 is on a state of raising ratio of 2, if that the absolute value of VSS is 1.25 V is detected, outputting the voltage detect result signal SN indicating the absolute value of VTKN of 0.625 V gives an equivalent effect.

The timepiece control circuit 303 uses the output voltage VSS of the raising and lowering circuit 49 as a power source. The timepiece control circuit 303 receives a first and a second stored electricity unit discharge control signals SO1 and SO2 from a stored electricity unit discharge control circuit 305, a stored electricity unit charge completion control signal SP from a stored electricity unit charging completion judge circuit 306, a motor drive trouble judge signal SQ from a motor drive trouble judge circuit 304, a high-frequency magnetic field detect result signal SK from high-frequency magnetic field detect circuit 307, an alternating current magnetic field detect result signal SL from an alternating current magnetic field detect circuit 308, and a rotation detect result signal SM from a rotation detect circuit 309.

Then the timepiece control circuit 303 generates the voltage detect control signal SX, and supplies it to the voltage detecting circuit 302.

And the timepiece control circuit 303 generates a motor driving signal SE, SF, SG, and SH, and supplies them to the motor drive circuit E, and also generates a non-rotation detect measure signal SY, and supplies it to the motor drive trouble judge circuit 304.

The motor drive signal SE is a pulse signal comprised of a normal driving pulse, a rotation detect pulse, a high frequency magnetic field detect pulse, a magnetic field detect pulse, and an auxiliary pulse and so on. The normal driving pulse is a pulse supplied to the motor drive circuit E for regular motor drive. The rotation detect pulse is a pulse supplied to the motor drive circuit E when detecting whether or not there is a high-frequency magnetic field. The high frequency magnetic field detect pulse is a pulse supplied to the motor drive circuit E for detecting an external magnetic field. The auxiliary pulse is a pulse output when the motor fails to rotate by only the normal driving pulse, and has bigger effective electric power than the normal driving pulse. When the auxiliary pulse is generated, the non-rotation detect measure signal SY is generated.

The motor driving signal SF is a pulse for controlling the motor driving circuit E when discharging the battery 48.

The motor driving signal SG is a pulse for controlling the motor unit D when charging the battery 48 is completed.

The motor driving signal SH is a pulse for controlling the motor unit D to other hand movement from normal hand movement, and, when motor trouble takes place, is output.

When a high-frequency magnetic field detect pulse is supplied to the motor drive circuit E as the motor drive signal SE, a bidirectional induced voltage is generated in a drive coil of the stepping motor. The high frequency magnetic field detect circuit 307 is a circuit to detect existence of a high-frequency magnetic field by comparing a voltage SJ of the induced voltage with the pre-determined reference value for alternating current magnetic field detection.

When a magnetic field detect pulse is supplied to the motor drive circuit E as the motor drive signal SE, a bidirectional induced voltage is generated in a drive coil of the stepping motor. The alternating current magnetic field detect circuit 308 is a circuit to detect existence of an alternating current magnetic field by comparing a voltage SJ of the induced voltage with the pre-determined reference value for alternating current magnetic field detection.

When a rotation detect pulse is supplied to the motor drive circuit E as the motor drive signal SE, a bidirectional induced voltage is generated in a drive coil of the stepping motor. The rotation detect circuit 309 is a circuit to detect existence of a rotation of the drive motor by comparing a voltage SJ of the induced voltage with the pre-determined reference value for rotation detection.

Incidentally, a section in the timepiece control circuit 303 for outputting the motor drive signal SE, the high frequency magnetic field detect circuit 307, the alternating current magnetic field detect circuit 308, and the rotation detect circuit 309 are based on known techniques which have been used for controlling stepping motor drive. For example, Japanese Patent Application Laid-Open Publication No. 10-225191 entitled "control device for stepping motor, its control method, and time keeping device", and Japanese Patent Publication No. 3-45798 entitled "analog electric timepiece" explain the technique.

An operation check function control circuit 310 receives a first external input signal SR1 and a first external input differential signal SR2. The first external input signal SR1 is a signal output from a first external input unit F, and indicating that a switch (a crown) in the first external input unit F is operated. The first external input differential signal SR2 is a differentiated signal of the first external input signal SR1. And the operation check function control circuit 310 outputs an operation check function control signal SS.

A second external input unit measure circuit 311 receives an operation check function control signal SS and a second external input signal ST. The second external input signal ST is a signal output from a second external input unit G, and indicating that a switch (a crown) in the second external input unit G is operated. And the second external input unit measure circuit 311 outputs an operation check function mode select signal SU which has two bits of SU1 and SU2.

The operation check function mode select circuit 312 receives the operation check function mode select signal SU and the operation check function control signal SS. And the operation check function mode select circuit 312 outputs an operation check function mode select result signal SV which has three bits of SV1, SV2, and SV3. The three bits of SV1, SV2, and SV3 of the operation check function mode select result signal SV enters into the stored electricity unit discharge control circuit 305, the stored electricity unit charging completion judge circuit 306, and the motor drive trouble judge circuit 304 respectively. A bit SV1 of the operation check function mode select result signal SV is a bit indicating by positive logic that the operation check function is in the mode 1. The bit SV1 has the high level when the mode of the operation check function is in the mode 1. A bit SV2 is a bit indicating by positive logic that the operation check function is in the mode 2. The bit SV2 has the high level when the mode of the operation check function is in the mode 2. A bit SV3 is a bit indicating by negative logic that the operation check function is in the mode 3. The bit SV3 has the low level when the mode of the operation check function is in the mode 3.

Next, referring to FIGS. 4, 5, and 7, the description will be given with respect to the operation check function control circuit 310, the second external input unit measure circuit 311, the operation check function mode select circuit 312, the stored electricity unit discharge control circuit 305, the stored electricity unit charging completion judge circuit 306, and the motor drive trouble judge circuit 304.

Figure 4:
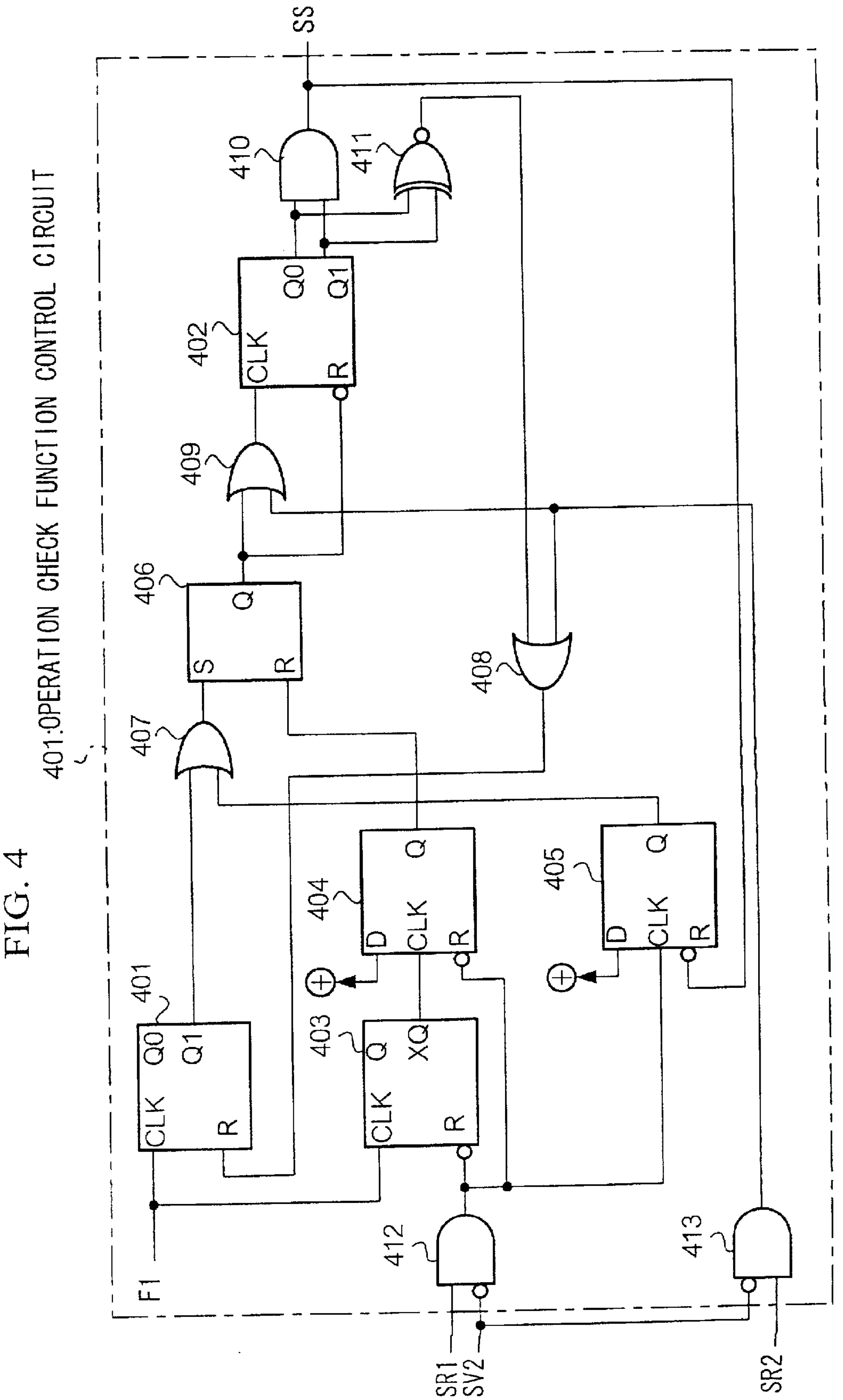
FIG. 4 is a circuit diagram showing the construction of the operation check function control circuit 310 shown in FIG. 3.

FIG. 4 is a circuit diagram showing the detailed construction of the operation check function control circuit 310 shown in FIG. 3. The operation check function control circuit 310 comprises two 2-bit counters 401 and 402, a 1-bit counter 403, two D flip-flaps 404 and 405, an SR latch 406, three double-input ORs 407 to 409, a double-input AND 410, a double-input XNOR (exclusive logic addition of negative logic output) 411, and two double-input of positive logic input and negative logic input ANDs 412 and 413.

In the reset terminal R of the 2-bit counter 401 enters an output signal of the OR 408. In the clock terminal CLK of the 2-bit counter 401 enters a clock signal F1 having a cycle of one second. The 2-bit counter 401 counts the clock signal F1 when the output signal of the OR 408 has the low level.

In the positive logic input of the AND 412 enters the first external input signal SR1. The signal SR1 becomes the high level when the crown which is the switch of the first external input unit F is pulled out by two clicks.

In the positive logic input of the AND 413 enters the first external input differential signal SR2. The signal SR2 is a differentiated signal of the signal SR1. In more detail, the signal SR2 is generated under a case when the crown in a state of being pulled out by two clicks is pushed back by one click or two, the first external input signal SR1 turns to the low level from the high level. The signal SR2 is a single pulse signal having a predetermined pulse width.

In the negative logic input of the ANDs 412 and 413 enters the operation check function mode select result signal SV2 output from the operation check function mode select circuit 312. When the signal SV2 has the low level, the ANDs 412 and 413 output the first external input signal SR1 and the first external input differential signal SR2 as they are.

In the clock terminal CLK of the 1-bit counter 403 enters the clock signal F1 having a cycle of one second. In the reset terminal R having the low active of the 1-bit counter 403 enters the output signal of the AND 412. The 1-bit counter 403 counts the clock signal F1 when the output signal of the AND 412 has the high level.

The data terminal D of the D flip-flap 404 is fixed at the high level. In the reset terminal R having the low active of D flip-flap 404 enters the output signal of the AND 412. In the clock terminal CLK of the D flip-flap 404 enters the output signal of the output terminal XQ of the 1-bit counter 403. Accordingly, under a state that the output signal of the AND 412 has the high level, when the output signal of the output terminal XQ of the 1-bit counter rises, the D flip-flap 404 reads the input signal having high level which is given to the data terminal D and outputs the same from the output terminal Q.

The data terminal D of the D flip-flap 405 is fixed at the high level. In the reset terminal R having the low active of D flip-flap 405 enters the output signal of the AND 410. In the clock terminal CLK of the D flip-flap 405 enters the output signal of the AND 412. Accordingly, under a state that the output signal of the AND 410 has the high level, when the output signal of the AND 412 rises, the D flip-flap 405 reads the input signal having high level which is given to the data terminal D and outputs the same from the output terminal Q.

The OR 407 receives the $2^1$ output Q1 of the 2-bit counter 401 and the output signal from the output terminal Q of the D flip-flop 405.

In the set terminal S of the SR latch 406 enters the output signal of the OR 407. In the reset terminal R of the SR latch 406 enters the output signal from the output terminal Q of the D flip-flap 404.

The OR 409 outputs a logical sum of the output signal of the output terminal Q of the SR latch 406 and an output signal of the AND 413.

In the clock terminal CLK of the 2-bit counter 402 enters the output signal of the OR 409. In the reset terminal R of the 2-bit counter 402 enters the output signal of the output terminal Q of the SR latch 406. The counter 402, when the output signal of the SR latch 406 has the low level, counts the signal SR2 supplied via the AND 413 and OR 409. Here, when the output of the OR 407 which is to be a set input S of the SR latch 406 has the low level, the output Q of the SR latch 406 becomes the low level by receiving the high level signal once in the reset input R.

The 2-bit counter 402 has a $2^0$ output Q0 and a $2^1$ output Q1. These output terminals are connected to input terminals of the AND 410. Accordingly, in a case in which the output Q of the SR latch 406 has the low level, when as SR2 three pulse signals enter into the 2-bit counter 402, both the outputs Q0 and Q1 become the high level and the output signal of the AND 410 becomes the high level.

The output signal of the AND 410 is output as operation check function control signal SS from the operation check function control circuit 310. The signal SS when the high level starts the operation check function. And the signal SS is input to the reset input terminal R having the low active of the D flip-flop 405 as mentioned above.

The XNOR 411, when both of the $2^0$ output Q0 and the $2^1$ output Q1 of the counter 402 have the low level or high level, outputs a signal of high level, and when the levels of them are different, outputs a signal having the low level.

The OR 408 outputs a logical sum of the output signal of the XNOR 411 and the output signal of the AND 413 to the reset terminal R of the 2-bit counter 401.

Figure 6A:
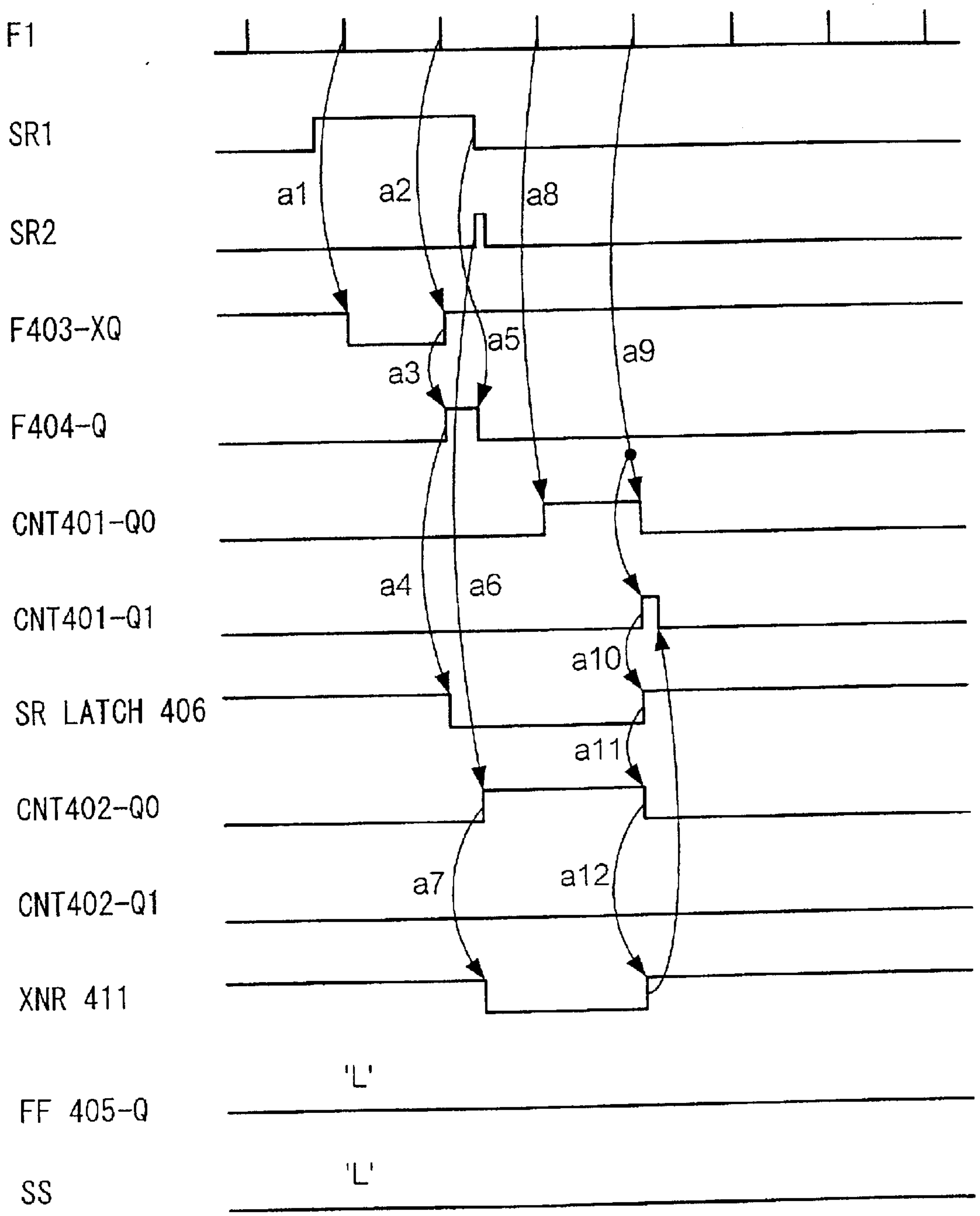
FIGS. 6A and 6B are timing charts showing operation of the operation check function control circuit 310 shown in FIG. 3.
Figure 6B:
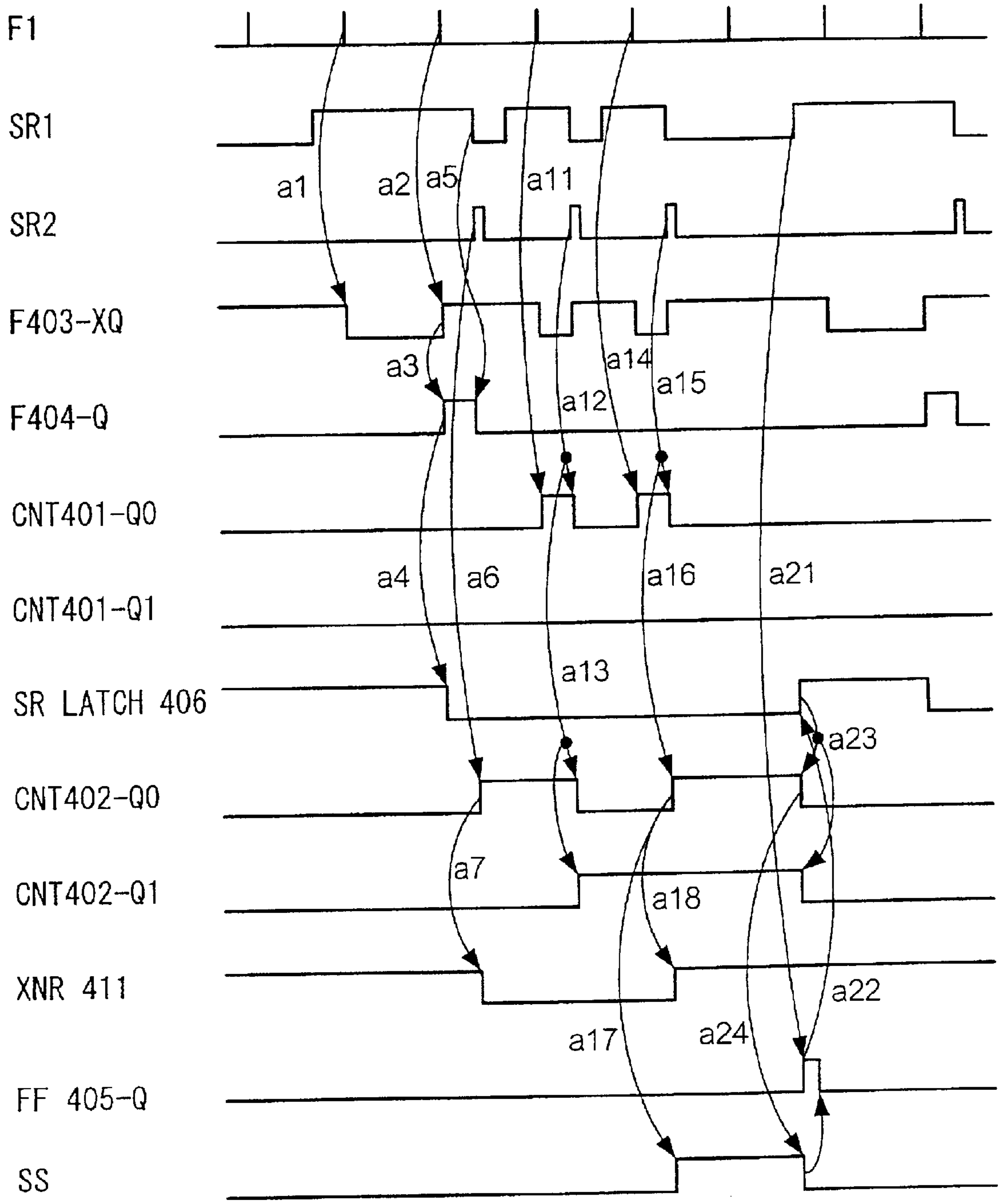
Figure 7:
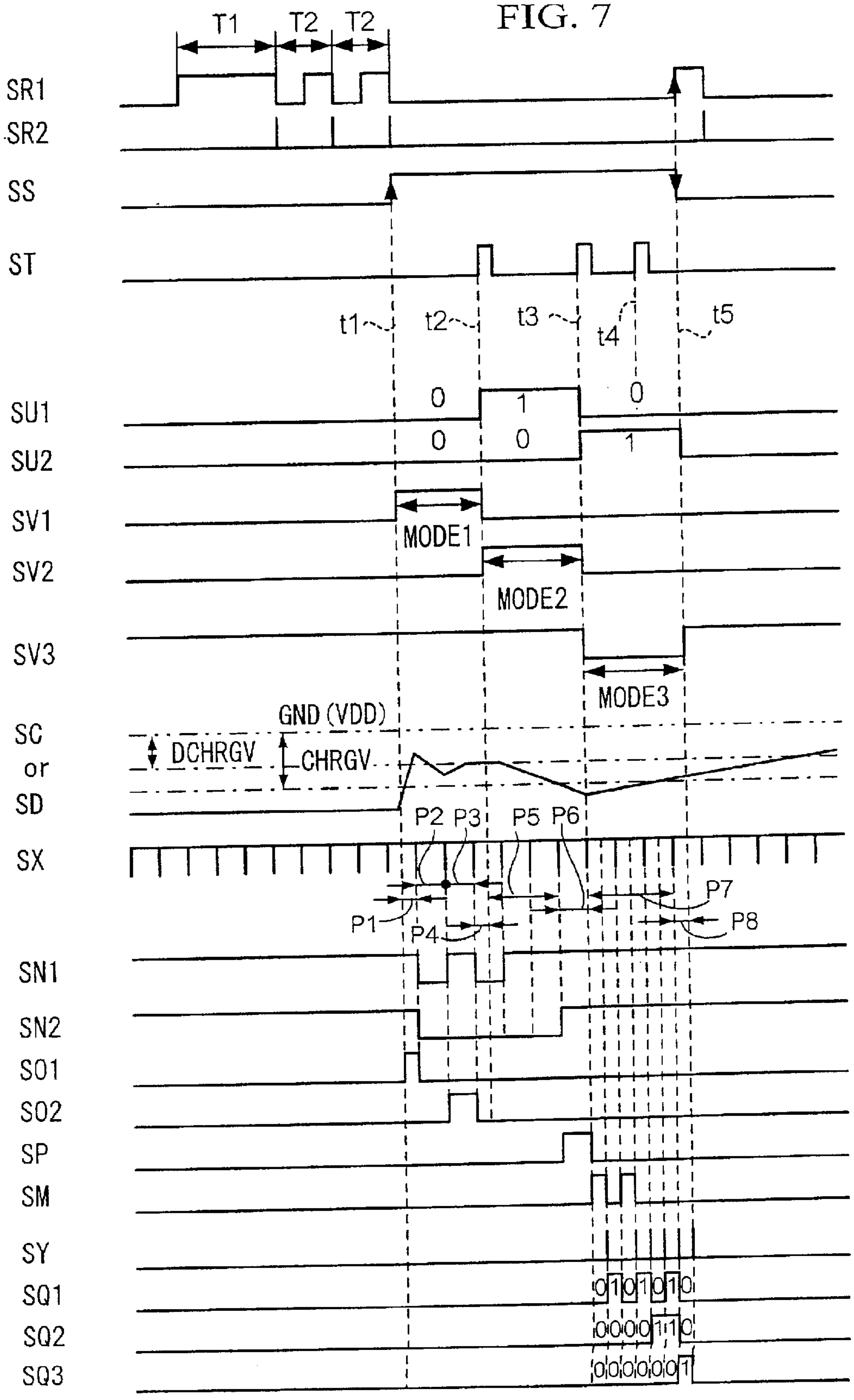
FIG. 7 is a timing chart showing one example of operations of each unit shown in FIG. 3.

FIGS. 6A, 6B, and 7 are timing charts showing a function of the operation check function control circuit 310 explained above.

First, the state when the operation check function mode is not at the mode 2, the operation check function mode select result signal SV2 has the low level, and the operation check function control signal SS has the low level will be described.

In this case, the operation check function control circuit 310 receives the signal SR1 having the high level for more than 1 or 2 second (period T1) of time, and from the time the signal SR1 turns to the low level, when the signal SR1 falls twice continuously from the high level to the low level at an interval T2 of less than 1.5 second average, raises the operation check function control signal SS to the high level.

This operation is described by reference to FIGS. 6A and 6B.

At the initial state, the output signal Q of the SR latch 406 has the high level, both the output signals Q0 and Q1 of the counter 402 have the low level, the signal SS has the low level, the output signal of the double-input XNOR 411 has the high level, both the output signals Q0 and Q1 of the counter 401 have the low level, and the output signal Q of the D flip-flap 405 has the low level.

Here, when the crown is pulled out to the second click, the signal SR1 becomes the high level. As a result, the output signal of the AND gate 412 becomes the high level, and the reset of the counter 403 and the D flip-flap 404 are cancelled.

After this cancellation, when the first clock pulse F1 is generated, by this clock pulse F1 counting of the counter 403 is carried out, and the output signal XQ of the counter 403 falls (the arrow a1).

Then, when the second clock pulse F1 is generated, counting of the counter 403 is carried out further, and the output signal XQ of the counter 403 rises (the arrow a1). As a result, the high level signal is input to the D flip-flop 404, and the output signal Q of the D flip-flop 404 rises (the arrow a3). Then by this rise of the output signal Q of the D flip-flop 404, the SR latch 406 is reset, and the output signal Q of the SR latch 406 becomes the low level (the arrow a4). And because the SR latch 406 becomes the low level, the reset of the counter 402 is cancelled, and the state of the counter 402 becomes practicable to counting.

Next, when the crown is pushed back from the second click to the first click or the normal position, the signal SR1 falls to the low level. As a result, the counter 403 and the D flip-flap 404 are reset, and the output signal Q of the D flip-flap 404 becomes the low level.

On the other hand, when the pulse signal SR2 is generated by the fall of the signal SR1, the pulse signal SR2 starts the counter 402 to conduct the counting up, and the output signal Q0 of the counter 402 rises to the high level (the arrow a6). As a result, the output signal of the XNOR 411 becomes the low level (the arrow a7). Thus the reset of the counter 401 is cancelled, and the state of the counter 401 becomes practicable to counting.

As described above, after the crown is pulled out to the second click, when two clock pulses F1 are generated, the state of the counter 402 becomes practicable to counting. Then when the crown is pushed back to the first click or the normal position, the state of the counter 401 becomes practicable to counting.

In the above description, in the period from the rise to the fall of the signal SR1, two clock pulses F1 are generated. However, a case where three or more clock pulses F1 are generated falls into the same result.

Afterward, if the crown is not handled, the signal SR1 does not change, and the clock pulse F1 is generated, counting up is carried out at the counter 401, and the output signal Q0 of the counter 401 becomes the high level (the arrow a8). Then when the clock pulse F1 is generated further, counting up is carried out at the counter 401, and the output signal Q0 of the counter 401 becomes the low level, and the output signal Q1 of the counter 401 becomes the high level (the arrow a9).

Then because the output signal Q1 of the counter 401 becomes the high level, the output signal Q of the SR latch 406 become the high level (the arrow a10). As a result, the counter 402 is reset, the output signal Q0 of the counter 402 becomes the low level (the arrow a11), and the output signal of the XNOR gate 411 becomes the high level (the arrow a12).

Then because the output signal of the XNOR 411 becomes the high level, the counter 401 is reset (the arrow a13), and afterward the counter will not count even if the clock pulse F1 is given.

As described, even when the counters 401 and 402 become practicable to counting by pulling the crown to the second click and pushing it back to the original position, if the crown is not handled, the operation check function control circuit 310 returns to the state before handling the crown, and the signal SS does not change.

Compared to this, when the counters 401 and 402 become practicable to counting by pulling the crown to the second click, if a prescribed crown handling is done, the signal SS is raised by the operation check function control circuit 310.

From here, FIG. 6B is described. The operations with the arrow a1 to a7 are the same as in FIG. 6A.

As described in FIG. 6A, after the crown is pulled out to the second click, when two clock pulses F1 are generated, the state of the counter 402 becomes practicable to counting. Then when the crown is pushed back to the first click or the normal position, the state of the counter 401 becomes practicable to counting (the arrows a1 to a7).

Afterward, if the clock pulse F1 is generated, counting up at the counter 401 is carried out by this clock pulse F1, and the number of count of the counter 401 becomes “1” (the arrow a11). But before the next clock pulse F1 is generated, if the pulse SR2 is generated by the handling of the crown, the counter 401 is reset, and the number of count of the counter 401 becomes “0” (the arrow a12). And counting up at the counter 402 is carried out by the pulse SR2, and the number of count of the counter 402 becomes “2” (the arrow a13).

Then when the clock pulse F1 is generated, counting up at the counter 401 is carried out by this clock pulse F1, and the number of count of the counter 401 becomes “1” (the arrow a14). But before the next clock pulse F1 is generated, if the pulse SR2 is generated by the handling of the crown, the counter 401 is reset, and the number of count of the counter 401 becomes “0” (the arrow a15). And counting up at the counter 402 is carried out by the pulse SR2, and the number of count of the counter 402 becomes “3” (the arrow a13). As a result, the signal SS becomes the high level (the arrow a17). By this, the operation mode of the electrical timepiece becomes the mode 1. And at the D flip-flap 405, the reset is cancelled.

When the number of count of the counter 402 becomes “3”, the output signal of the XNOR gate 411 becomes the high level (the arrow a18). As a result, the counter 401 is reset. Therefore, afterward if the clock pulse F1 is generated, counting operation at the counter 401 will not be carried out.

As described above, if in the period from the rise to the fall of the signal SR1, two or more clock pulses F1 are generated, after the fall of the signal SR1, and before the generation of the clock pulse F1, the fall of the signal SR1 (the pulse SR2) takes place, and before the generation of the next clock pulse F1, the fall of the signal SR1 (the pulse SR2) takes place, the signal SS is switched to the high level. Here, because the cycle of the clock pulse F1 is one second, the time period from the rise of the signal SR1 to the fall of the signal SR1, or the time period T1 in FIG. 7, will be fully satisfied with two seconds.

The time period from the first fall to the second fall of the signal SR1, or the time period from the third fall to the fourth fall of the signal SR1, or the time period T2 in FIG. 7, will be satisfied with 1.5 seconds.

Next, the state when the operation check function mode select result signal SV2 has the low level, and the operation check function control signal SS has the high level will be described.

In this case, when the signal SR1 rises, the mode 1 is cancelled. This operation is described in FIG. 6B.

First, when the signal SR1 rises, the high level signal is input to the D flip-flop 405, and the output signal Q of the D flip-flop 405 becomes the high level (the arrow a21). As a result, the SR latch 406 is set (the arrow a22), and by this the counter 402 is reset, and the number of count of the counter 102 becomes "0" (the arrow a23). Then because the counter 402 is reset, the signal SS becomes the low level, and the mode 1 is cancelled (the arrow a24).

And because the signal SS becomes the low level, the D flip-flap 405 is reset (the arrow a25). The operation after this differs depending on what kind of wave form is formed by the signal SR1, but is described already above.

Next, reference to FIGS. 4 and 7, the state when the operation check function mode is at the mode 2, and the operation check function mode select result signal SV2 becomes the high level will be described.

In this case, even if the signals SR1 and SR2 changes, the operation check function control signal SS does not turn to the low level.

Figure 5:
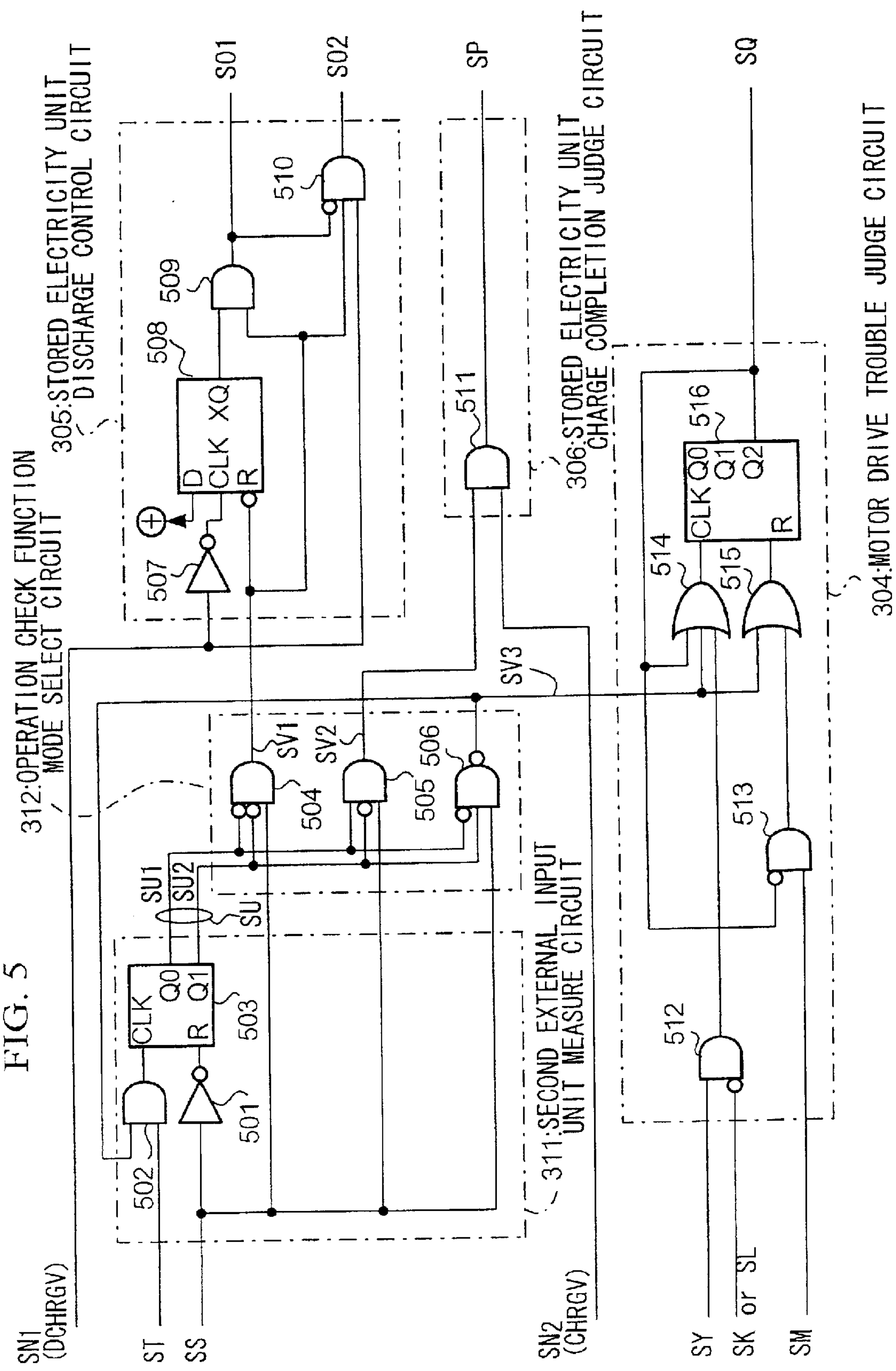
FIG. 5 is a circuit diagram showing a second external input unit measure circuit 311, operation check function mode select circuit 312, a stored electricity unit discharge control circuit 305, a stored electricity unit charging completion detect circuit 306, and a motor drive trouble detect circuit 304 shown in FIG. 3.

Next, referring to FIG. 5 the detailed description will given with respect to the second external input unit measure circuit 311, the operation check function mode select circuit 312, the stored electricity unit discharge control circuit 305, the stored electricity unit charging completion judge circuit 306, and the motor drive trouble judge circuit 304.

The second external input unit measure circuit 311 comprises an inverter 501, a double-input AND 502, and a 2-bit counter 503. The inverter 501 receives the operation check function control signal SS. The AND 502 receives the second external input signal ST and the operation check function mode select result signal SV3. Here, the second external input signal ST is a signal which becomes the high level when the switch (indicator switch) of the second external input unit G is pushed back. As for the 2-bit counter 503, in the reset terminal R enters an output signal of the inverter 501, and in the clock terminal enters an output signal of the AND 502. Therefore, when the signal SS has the high level and the signal SV3 has the high level, the 2-bit counter 503 counts the number of pulses (the number how many times the indicator switch is pushed back) input as the second external input signal ST. Here, the signal SV3 is a signal generated by decoding the output of the counter 503, becomes the low level when the number of count of the counter 503 is 2. Therefore, the counter 503 counts the value from 0 to 2.

In an explanatory example of FIG. 7, after the operation check function control signal SS becomes the high level at the time t1, the bits SU1 (Q0) and SU2 (Q1) of the counter 503 has been the low level. At the time t2, as the signal ST a pulse signal is input to the counter 503, the bit SU1 of the counter 503 becomes the high level and the bit SU2 of the counter 503 becomes the low level. At the time t3, as the signal ST another pulse signal is input to the counter 503, the bit SU1 of the counter 503 becomes the low level and the bit SU2 of the counter 503 becomes the high level. When the bit SU1 becomes the low level and the bit SU2 becomes the high level, the signal SV3 becomes low level. In this case, for example, even if as the signal ST a pulse signal is input to the counter 503, the output value of the counter 503 does not change. The counter 503 is reset when the signal SS becomes the low level (at the time t5).

The operation check function mode select circuit 312 in FIG. 5 comprise an AND 504 having three input of two negative-logic inputs and one positive-logic input, a NAND 506 having three input of one negative-logic inputs and two positive-logic input. In two negative-logic inputs of the AND 504 enter bits SU1 and SU2 of the counter 503, and in one positive-logic input of the AND 504 enters the operation check function control signal SS. As shown in FIG. 7, when both the bits SU1 and SU2 of the counter 503 has the low level and the operation check function control signal SS has the high level, the AND 504 outputs the operation check function mode select result signal SV1 with the high level indicating the operation check function is at the mode 1. In the same way, when the bit SU2 of the counter 503 has the low level and both the bit SU1 and the operation check function control signal SS has the high level, the AND 505 outputs the operation check function mode select result signal SV2 with the high level indicating the operation check function is at the mode 2. When the bit SU1 of the counter 503 has the low level and both the bit SU2 and the operation check function control signal SS has the high level, the NAND 506 outputs the operation check function mode select result signal SV3 with the high level indicating the operation check function is at the mode 3.

The stored electricity unit discharge control circuit 305 comprises an inverter 507, a D flip-flop 508, a double-input AND 509, and a triple-input AND 510.

In the inverter 507 enters a voltage detect result signal SN1. The signal SN1 is one of the bits of the voltage detect result signal SN. The signal SN1 becomes the high level, when the detection is made that the signal SC of indicating the stored voltage VKTN becomes lower than the discharge reference voltage DCHRGV (further from the ground VDD, that is, not reaching the predetermined discharge voltage). Incidentally, instead of the above configuration, it is also possible to make the signal SN1 the high level, when the detection is made that the stored voltage raising and lowering result signal SD which indicates the output voltage VSS of the raising and lowering circuit 49 becomes lower than the discharge reference voltage DCHRGV.

As for the D flip-flop 508, in the reset terminal R having the low active enters the operation check function mode select result signal SV1, in the clock terminal CLK enters the output signal of the inverter 507, and the data terminal D is fixed at the high level.

The AND 509 outputs a logical product of the output signals of the output terminal XQ of the D flip-flop 508 and the operation check function mode select result signal SV1 as the first stored electricity unit discharge control signals SO1.

The AND 510 comprises a negative-logic input and two positive-logic input. Into the negative-logic input enters the first stored electricity unit discharge control signals SO1 from the AND 509. Into the positive-logic inputs enters the operation check function mode select result signal SV1 and the discharge reference voltage DCHRGV. The AND 510 outputs a logical product of the input signals as the second stored electricity unit discharge control signals SO2.

As shown in FIG. 7, the stored electricity unit discharge control circuit 305 makes the first stored electricity unit discharge control signals SO1 the high level when operation check function mode shifts to the mode 1 under the condition when the battery unit (battery 48) is being charged.

In a period P1 when the first stored electricity unit discharge control signals SO1 has the high level, the timepiece control circuit 303 in FIG. 3 outputs as the motor driving signal SF a drive clock signal which short-circuits the motor dive circuit E or fast-forwards the motor unit D. Accordingly, in the period P1 in FIG. 7, the electrical charge in the battery unit 48 is released to be a drive current on a scale much larger than that at the normal drive state in the motor unit D.

As discharging continues, when the stored electricity voltage VTKN or the stored electricity voltage raising and lowering result VSS becomes higher than the discharge reference voltage DCHRGV (that is, nearer to the ground VDD, meaning discharging advanced), the signal SN1 becomes the low level synchronous to the voltage detect control signal SX which repeatedly becomes the low level in a predetermined cycle. When the signal SN1 becomes the low level, the stored electricity unit discharge control circuit 305 makes the first stored electricity unit discharge control signals SO1 the low level. By this, the period P1 shifts to a period P2.

When the first stored electricity unit discharge control signals SO1 becomes the low level, the timepiece control circuit 303 in FIG. 3 outputs for example a signal to stop the motor drive unit E. Accordingly, in the period P2, discharging the battery unit 48 is stopped, and the stored electricity voltage VTKN or the stored electricity voltage raising and lowering result VSS becomes to the low voltage gradually by voltage recovery effect. Then when the voltage VTKN or VSS becomes lower than the discharge reference voltage DCHRGV, the signal SN1 becomes the high level synchronous to the voltage detect control signal SX, and the second stored electricity unit discharge control signals SO2 becomes the low level. By this, the period P2 shifts to a period P3.

Incidentally, although not shown in FIG. 3, the operation check function control signal SS and the operation check function mode select result signal SV and the like are supplied to the timepiece control circuit 303. The timepiece control circuit 303 is capable of distinguishing the shifting state between each mode by these control signals.

When the second stored electricity unit discharge control signals SO2 becomes the high level, the timepiece control circuit 303 in FIG. 3 outputs as the motor driving signal SF a drive clock signal to fast-forward the motor unit D. Here, as fast-forwarding modes, there are a 32 hertz fast-forwarding, an intermittent drive of 32 hertz drive and stop, and 8 hertz fast-forwarding, and the like. In a period P3, the electrical charge of the battery unit 48 is re-released to be a drive current on a scale of smaller than that of the period P1 and larger than that at the normal drive state.

Then when the voltage VTKN or VSS becomes higher than the discharge reference voltage DCHRGV again, the signal SN1 becomes the low level at the timing synchronous to the voltage detect control signal SX, and the second stored electricity unit discharge control signals SO2 becomes the low level. By this, the period P3 shifts to a period P4.

When the second stored electricity unit discharge control signals SO2 has the low level, the timepiece control circuit 303 stops the motor drive circuit E. Therefore, in the period P4, discharging the battery unit 48 is stopped, and the stored electricity voltage VTKN of the battery unit 48 or the stored electricity voltage raising and lowering result VSS becomes to the low voltage gradually by voltage recovery effect again. Until the stored voltage becomes stable or the shift to the mode 2 is carried out by the external input, the states of the period P3 and P4 is repeated and the discharging is carried out. But FIG. 7 shows an example that after one repeat the shift to the mode 2 is conducted.

Next, the stored electricity unit charging completion judge circuit 306 shown in FIG. 5 will be described. The circuit 306 is composed of an AND 511, and outputs as the stored electricity unit charge completion control signal SP a logical product of the voltage detect result signal SN2 and the operation check function mode select result signal SV2. Here, the signal SN2 is a signal output from the voltage detecting circuit 302 and becomes the high level when the stored electricity voltage VTKN or the stored voltage raising and lowering result signal SD (VSS) becomes lower than the charge reference voltage CHRGV (that is, further from the ground VDD, or reaching the predetermined discharge voltage). The signal SV2 is a signal output from the operation check function mode select circuit 312 and becomes the high level when the mode is 2. Accordingly, the signal SP becomes the high level when the operation check function is at mode 2 and the stored electricity unit 48 is charged until the charge reference voltage CHRGV.

In the mode 2 in the timing chart of FIG. 7, a vibration is given to the timepiece from outside, and electricity is generated in the generator system A. Therefore the charging to the battery unit 48 is conducted, and the stored electricity voltage VTKN is going down (period P5). During this time, the timepiece control circuit 303 supplies for example a prefixed pulse signal to the motor dive circuit E, and controls the motor unit D to the normal hand movement (one-second interval movement).

Charging continues, and when the stored electricity voltage VTKN or the stored voltage raising and lowering result signal SD (VSS) becomes lower than the charge reference voltage CHRGV, the signal SN2 becomes the high level synchronous to the voltage detect control signal SX. And the stored electricity unit charge completion control signal SP becomes the high level. By this, the period P5 shifts to a period P6.

When the stored electricity unit charge completion control signal SP becomes the high level and the stage enters into the period P6, the timepiece control circuit 303 supplies for example the motor driving signal SG to the motor dive circuit E, and controls the hand movement state of the motor unit D to for example two-second interval movement which is different from the normal hand movement (in this case, one-second interval movement). By this change of the hand movement state, the notification of the completion of the charging is made. Incidentally, in the period P6, if the charging voltage increases (that is, discharging is conducted), charging is conducted in the same way as the period P5. Accordingly, in practical, the period P5 and P6 is repeated, and the charging voltage becomes stable.

Next, the motor drive trouble judge circuit 304 shown in FIG. 5 will be described. The circuit 304 comprises double-input ANDs 512 and 513, both having a positive-logic input and a negative-logic input, a triple-input OR 514, a double-input OR 515, and a 3-bit counter 516.

The AND 512 receives the non-rotation detect measure signal SY as a positive-logic input, and the high-frequency magnetic field detect result signal SK or the alternating current magnetic field detect result signal SL as a negative-logic input. Here, the signal SY is a signal generated when the non-rotation in the motor unit D is detected. The signal SK and SL becomes the high level when magnetic field is detected.

The AND 512 receives the rotation detect result signal SM as a positive-logic input, and an output bit Q2 of the counter 516 as a negative-logic input. Here, the signal SM becomes the high level when the non-rotation in the motor unit D is detected. The output bit Q2 of the counter 516 becomes the high level when the counter number of the counter 516 becomes 4 or more.

The OR 514 receives the output signal of the AND 512, the operation check function mode select result signal SV3, and the output bit Q2 of the counter 512.

The OR 515 receives the output signal of the AND 513 and the operation check function mode select result signal SV3.

The operation of the motor drive trouble judge circuit 304 configured as explained above will be described by reference to FIG. 7 as follows.

In FIG. 7, at the mode 2, when the indicator switch is pushed on, shift to the mode 3 is carried out (the period P6 to P7). In this mode 4, the operation check function mode select result signal SV3 becomes the active level (low level), and the reset of the counter 516 of the motor drive trouble judge circuit 304 is cancelled.

At the mode 3, the quality verification of the operation state under high and low temperature condition is carried out. The quality verification is carried out as follows.

First, the timepiece control circuit 303 in FIG. 3 supplies the motor drive signal SE to the motor drive circuit E, and conducts a normal control of the motor unit D (one-second interval movement, rotation detect, drive by auxiliary pulse under a certain condition, and the like).

Here, this supply of the motor drive signal SE rotates the motor. And when the rotation is detected, the rotation detect result signal SM is output from the rotation detect circuit 309, and thus the counter 516 is reset.

On the other hand, if the motor does not rotate with the supply of the signal SE, pulse signals including the auxiliary pulse having bigger effective electric power than the normal driving pulse are automatically supplied to the motor drive unit D from the timepiece control circuit 303, and at the same time the timepiece control circuit 303 outputs the non-rotation detect measure signal SY.

The counter 516 counts the number of generation of the signal SY.

When the non-rotation detect measure signal SY enters into the counter 516 four times successively under a condition of no detection of rotation, the output bit Q2 of the counter 516 becomes the high level, and the motor drive trouble judge signal SQ indicating that the motor has problem is output.

The timepiece control circuit 303, when the motor drive trouble judge signal SQ becomes the high level, supplies to the motor drive circuit E, for example, the motor drive signal SH for controlling the motor unit D to two-second interval hand movement which is different from the normal hand movement of one-second interval hand movement.

On the other hand, when the motor drive trouble judge signal SQ becomes the high level, the counter 516 no longer receives reset signal and clock signal. Therefore, the counter 516 stops counting. The signal SQ maintains the high level until the mode 3 is cancelled and the operation check function mode select result signal SV3 becomes the high level.

Namely, even after the quality verification operation under high and low temperature ends and the temperature becomes normal temperature, as long as the mode 3 is maintained, drive signals having different hand movement state from the normal hand movement is supplied to the motor unit D.

Accordingly, after the quality verification operation, notification of the motor drive trouble occurred during the quality verification operation continues to be made.

Next, the motor driving signal SF for discharging the battery unit will be described by reference to FIG. 8.

Figure 8:
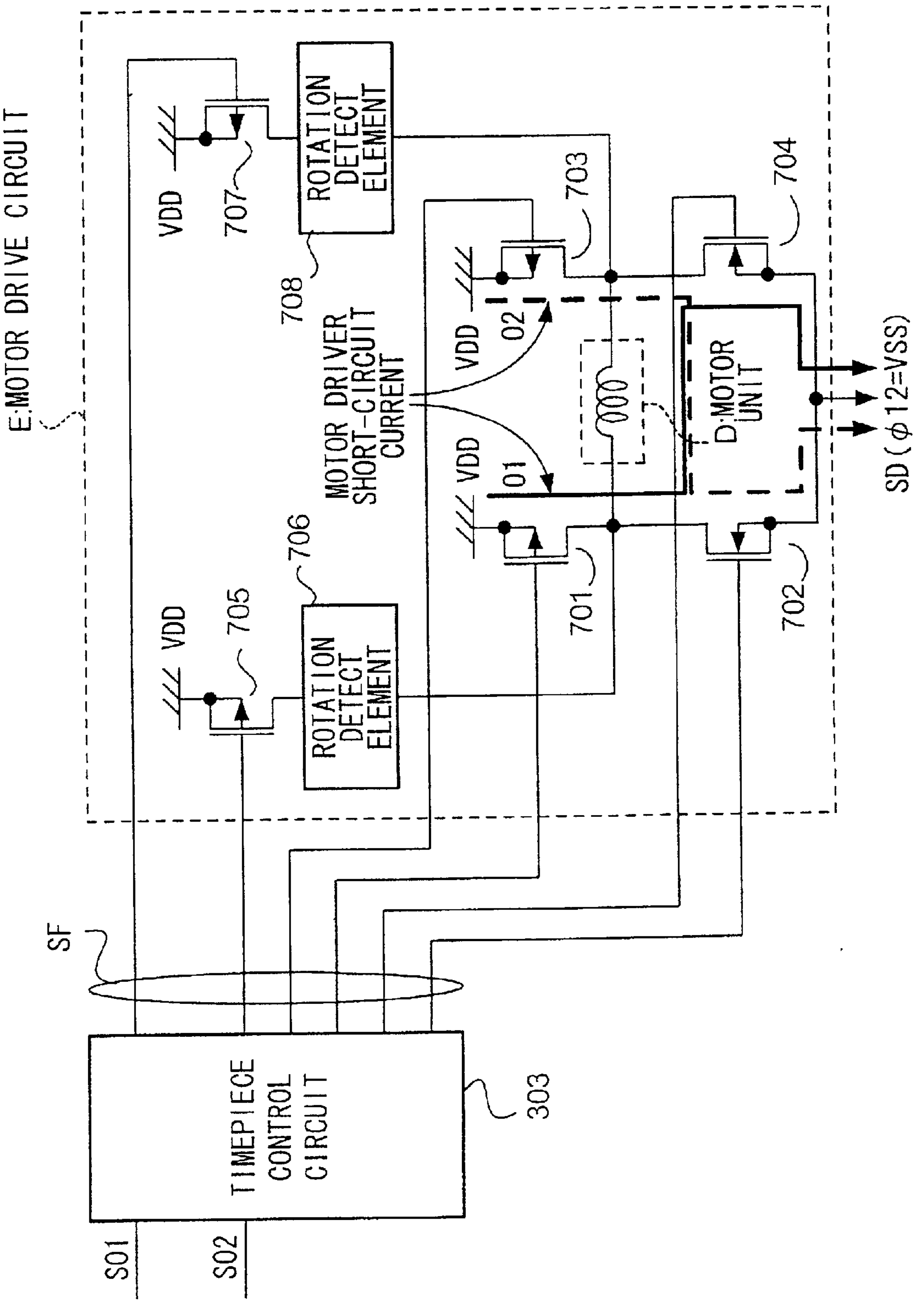
FIG. 8 is a block chart explaining a discharging current in a motor drive unit E shown in FIG. 3.

FIG. 8 is a block diagram showing the timepiece control circuit 303 shown in FIG. 1, the motor drive circuit E and the motor unit D. The motor drive circuit E comprises switches 701 to 705 and 707, and rotation detect use elements 706 and 708. In the example shown in FIG. 8, switches 701, 703, 705, and 707 are P-channel MOS (metal oxide semiconductor) transistors, and switches 702 and 704 are N-channel MOS transistors.

Four switches 701 to 704 form a bridge circuit which drives the stator winding of the motor unit D by use of a potential difference between VDD and VSS as source voltage.

Rotation detect use elements 706 and 708 are elements to place restrictions on current flowing through the motor unit D, and are comprised of resistors and the like.

Switch 705 and rotation detect use element 706 are connected in series between one terminal of the motor coil of the motor unit D and the power source line VDD. Switch 707 and rotation detect use element 708 are connected in series between other terminal of the motor coil of the motor unit D and the power source line VDD By the above configuration, in order to make short-circuit current flow in the motor drive circuit E for the purpose of discharging the battery unit 48, by turning the switches 701 and 704 on, it is possible to make the short-circuit current O1 flow in accord with load of the motor unit D. By turning the switches 701 and 704 on, it is also possible to make the short-circuit current O2 flow in accord with load of the motor unit D. And by making one of short-circuit currents O1 or O2 flow constantly, or by making short-circuit currents O1 and O2 flow by turns at a predetermined fast-forwarding cycle, it is possible to control the short-circuit current.

When required to generate a comparatively small discharge current, it is possible to make discharge current flow to the motor unit D via the rotation detect use elements 706 or 708.

Figure 9A:
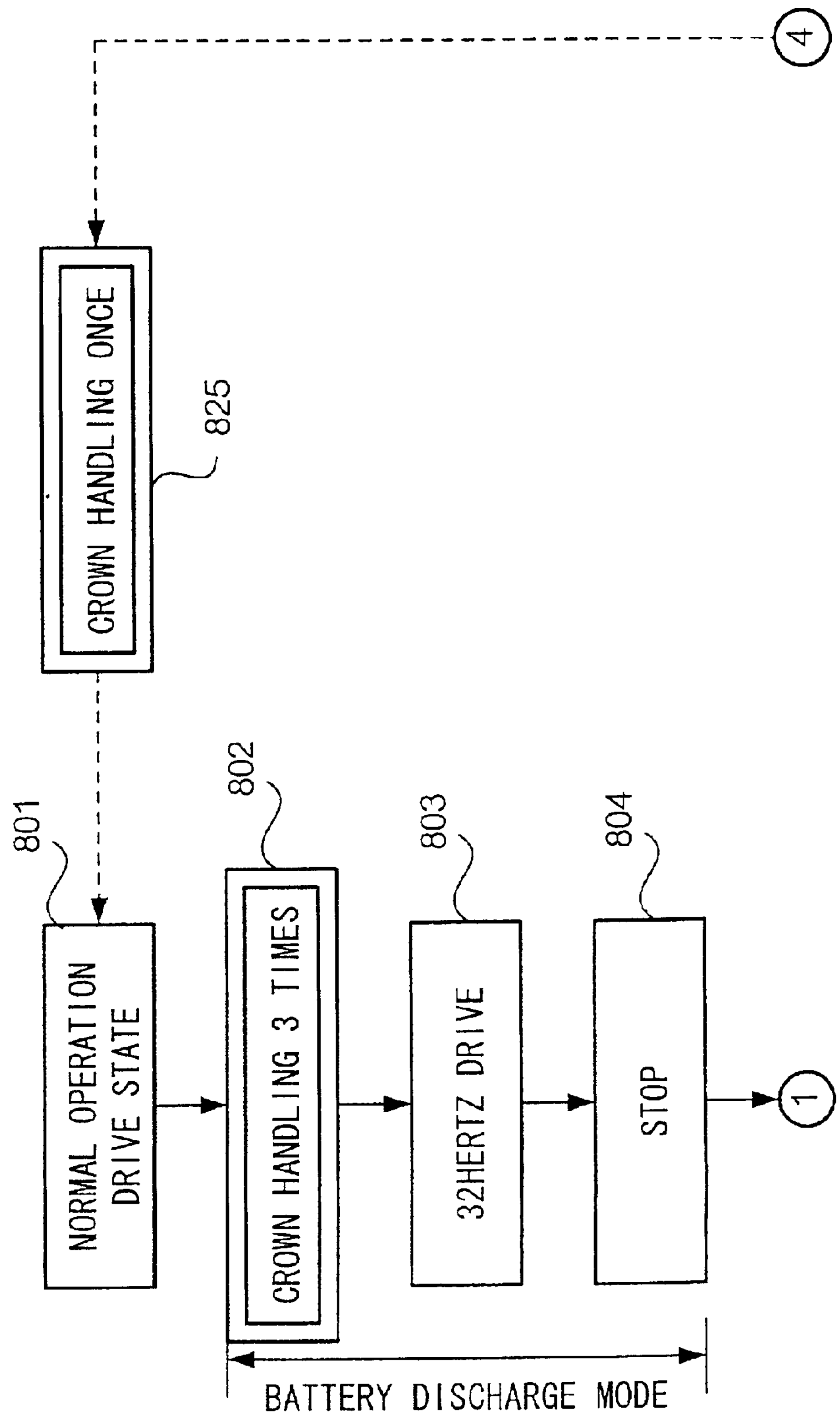
FIGS. 9A, 9B and 9C cooperate to form a flowchart showing flow of operation and checking process of the timepiece of the present invention.
Figure 9B:
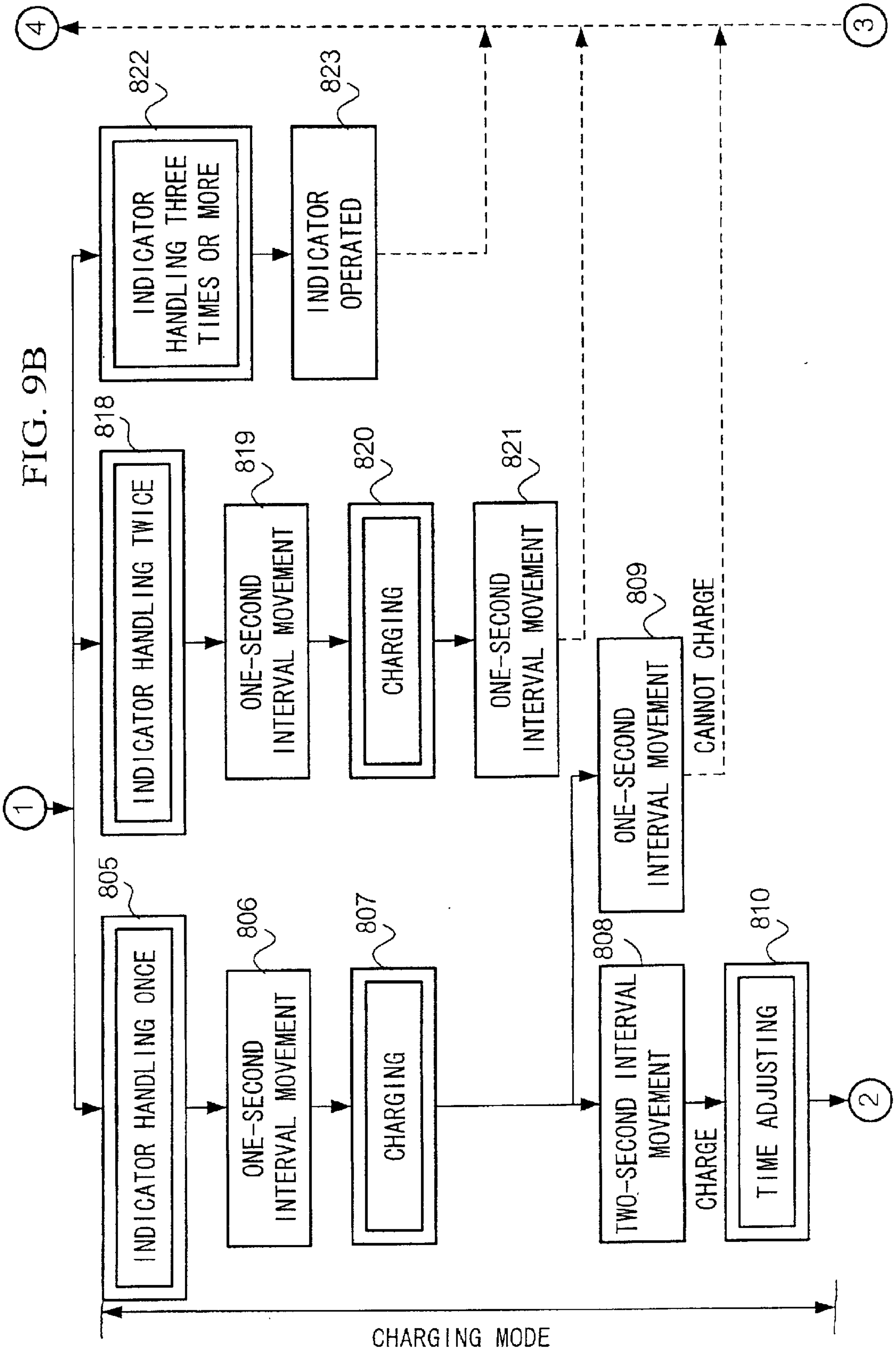
Figure 9C:
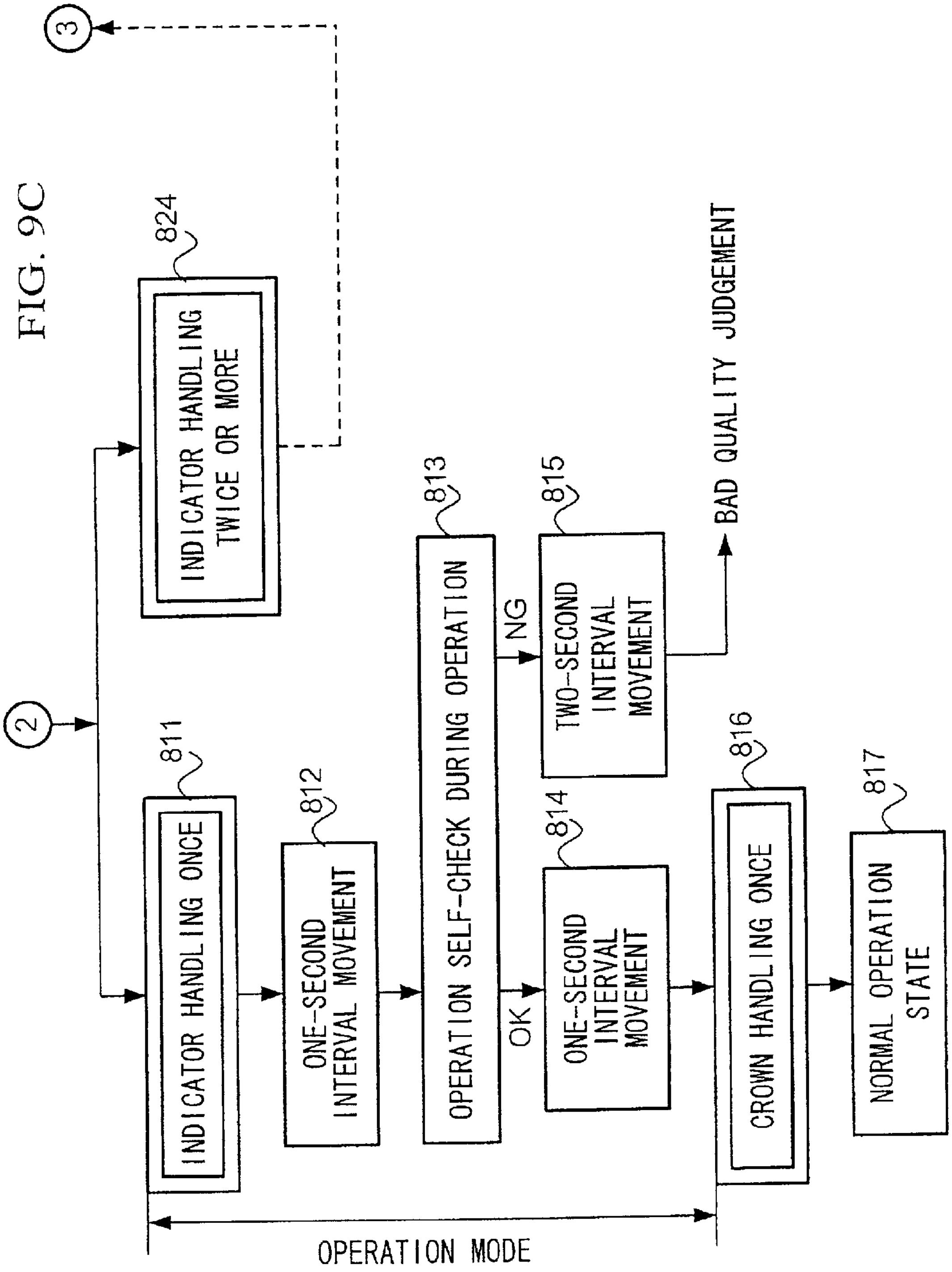
Figure 10:
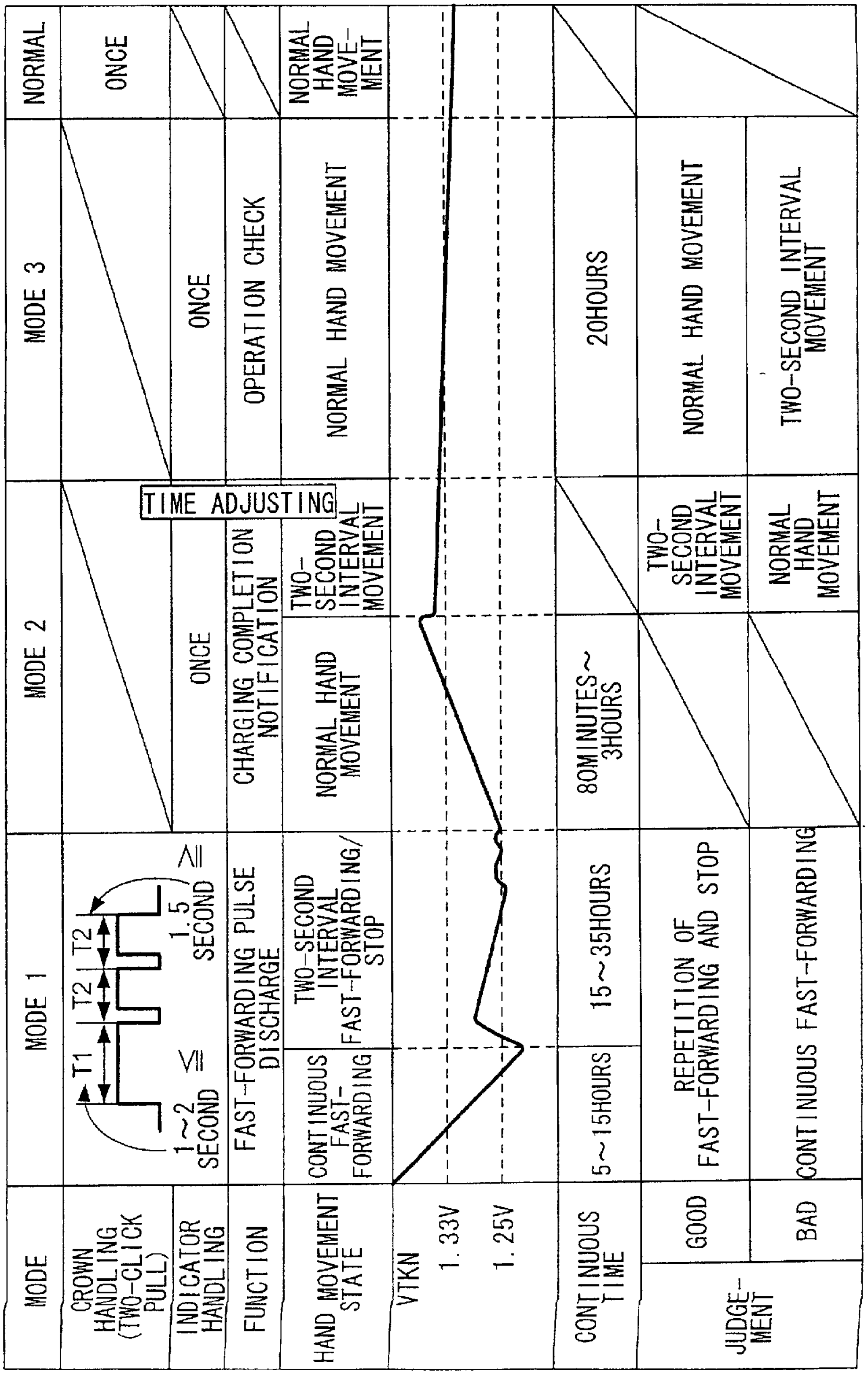
FIG. 10 is a diagram showing a specification of the operation and checking process.

Next, one example of the operation check method of the electronic timepiece explained above will be described by reference to FIGS. 9A, 9B, 9C, and 10. FIGS. 9A, 9B, and 9C cooperate to form a flowchart showing flow of operation check process of the electronic timepiece. The flowchart shows the check procedure of processes B101, B104, and B105, which comprise the operation check process B100 in the FIG. 2. FIG. 10 shows a specification of the operation check process in FIGS. 9A, 9B, and 9C.

Reference to FIGS. 9A, 9B, and 9C, when the timepiece is under normal operation drive state (step 801), crown operation for commanding to shift to the mode 1 in FIG. 10, that is to pull out the crown by two clicks and push it back for a predetermined time period, is done (step 802). As a result, the mode 1 (battery discharge mode) starts. Here, discharging by the drive by using for example a fast-forwarding pulse with 32 hertz (step 803). By this discharging, when the absolute value of the stored voltage VTKN declines below a prefixed voltage (in FIG. 10, 1.25V), the drive in the motor unit D stops (step 804). In practical, the fast-forwarding drive discharging in step 803 has two steps of the first being the continuous fast-forwarding discharging and the second being discharging by repeating fast-forwarding and stoppage by turn at a two second cycle. And when the voltage of the battery 48 returns, the steps 803 and 804 are carried out again and then repeatedly until the voltage will not return. It will take for example several tens of hour discharging until the state becomes stable at the state of the step 804. Incidentally, the time period necessary to discharge differs depending on the type of battery as shown in FIG. 10, but several tens of hours is adequate. Therefore after discharging for a predetermined time period of several tens of hours, by checking the hand movement state, it is possible to judge whether or not the discharging is completed. In this example, as shown in FIG. 10, when repeatedly fast-forwarding and stoppage is occurring, it is possible to judge the discharging is completed, and when continuously fast-forwarding is occurring, it is possible to judge the discharging is not completed.

After completion of the discharge, when the operator handles the indicator switch once (step 805), the mode shifts to the mode 2 (charging mode). In the mode 2, the motor unit D is driven (step 806) in the normal hand movement method (one-second interval movement). During this period, by giving vibration, electricity is generated in the generator system A, and the battery 48 is charged (step 807). In here, charging for from several tens of minutes to several hours is carried out, and when the absolute value of the stored voltage VTKN becomes equal to or larger than the predetermined voltage (in FIG. 10, 1.33 V), the normal hand movement state shifts to the two-second interval movement state (step 808). Therefore, after the predetermined time period, if the normal hand movement state is maintained, it is possible to judge the charging function has problem (step 809). In here, before the operation check of the mode 3, time adjusting is carried out (step 810). Time adjusting is done by for example pulling out the crown by two clicks and turning the crown. In the present embodiment, when the mode is at the mode 1 or 3, if the crown is operated, the operation check function is released. But, when the mode is at the mode 2, if the crown is operated for adjusting time, the mode does not shift to other mode.

Next, when the operator handles the indicator switch once (step 811), the mode shifts to the mode 3 (operation mode). In the mode 3, the motor unit D is driven (step 812) in the normal hand movement. Then in the electronic timepiece, self-verification of the drive malfunction during operation is carried out by use of the auxiliary pulse (step 813). In here, when the successive pulse drive by using more than a predetermined auxiliary pulses is not carried out during operation, the electronic timepiece judges itself as normal and leaves the hand movement state in the one-second interval movement (step 814). By this, the operator can judge that the electronic timepiece is in good quality. On the other hand, when the successive pulse drive by using more than a predetermined auxiliary pulses is carried out during operation, the electronic timepiece judges itself as bad and makes the hand movement state in the two-second interval movement (step 815). By this, the operator can judge that the electronic timepiece is in bad quality.

Next, when the operator performs a two-click crown pull-out (step 816), the mode 3 is cancelled, and the normal operation state is recovered (step 817).

Incidentally, at the step 814, when the indicator handling is carried out twice (step 818), the movement becomes the one-second interval movement (step 819). In this case, even if the charging is carried out next (step 820), the one-second hand movement continues (step 821) irrespective of the charging state. And at the step 804, when the indicator handling is carried out three times or more (step 822), the indicator for indicating the charging state is put into operation (step 823). And also at the step 810, it is conceivable that indicator handling is carried out twice or more (step 824), or the operation state becomes that of the step 821 or 823. In these cases, when the crown is handled once next time (step 825), the operation returns to the normal drive state of the step 801. By these check procedure, even if the operator makes a mistake in inputting operation with the indicator, it is impossible to happen mis-judgement of the poor quality product as good quality one. For example, at the step 804, the normal check flow is first an indicator handling then shifting to the mode 2. However, it can happen that the operator performs indicator handling twice by mistake. In this case, one-second interval movement takes place. And the operator cannot tell that the movement is of the step 806 or 819. But since the operator thinks that the indicator handling is performed once, the operator thinks the mode is at the mode 2 and conducts charging. In this case, charging at the step 820 follows and then one-second interval movement at the step 821 follows. And the operator thinks the step 821 as the step 809, and judges the electronic timepiece to be in poor condition (in reality, since at the mode 1 the indicator is handled twice, the mode is shifted to the mode 3 not 2). As described here, there are cases that the check flow shifts to the step 825 due to mis-judgement of the good quality product as poor quality one. But it is impossible to mis-judge the poor quality product as good quality one. And the misjudged timepiece as poor quality is undoubtedly judged as good when the check is redone from the step 825. And at the step 804, when the indicator handling is performed three times or more, that is as the above case when the operator performs indicator handling three times or more by mistake, the third indicator handling is for example an operation for starting displaying the charging amount indicator. In this check flow, since there is no process to start displaying the charging amount indicator, the operator can tell immediately that the mode is not at the mode 2 due to difference of the display. Therefore, the operator thinks that the indicator handling is wrongly done, and proceeds to the step 825, then reconducts checking. On the other hand, at the step 810, if the indicator handling is performed twice or more, the second indicator handling is an operation for starting displaying the charging amount indicator. In this check flow, since there is no process to start displaying the charging amount indicator, the operator can tell immediately that the mode is not at the mode 3 due to difference of the display. Therefore, the operator thinks that the indicator handling is wrongly done, and proceeds to the step 825, then re-conducts checking.

As described above, with the present embodiment, at the mode 1, by performing an external input operation to the electronic timepiece, discharging is carried out by fast-forwarding drive in the motor unit D, or by short-circuiting of the motor drive circuit E, or the like. Accordingly, no special provision for discharging the battery is necessary. And when the mode becomes the mode 1, the shift takes place from the normal hand movement state to the different state of fast-forwarding hand movement or hand movement stoppage. By looking the difference of the hand movement, the mode shift is easily verified.

In the above embodiment, the external input operation is performed by use of the crown and the indicator switch. But the present invention is not limited to this. It is possible to use other mechanical input method. And it is also possible to furnish an infrared remote control receiver unit in the electronic timepiece, and use infrared signal as input method. Electricity, a radio wave, light, sound, an electromagnetic wave, heat, and the like are also applicable as input method.

In the above embodiment, discharging at the mode 1 is continued until the battery voltage reaches the prescribed voltage. And when the battery voltage reaches the prescribed voltage, the discharging and the hand movement stop. Accordingly, by the hand movement (fast-forwarding or stoppage), judging is possible whether discharging continues or discharging is completed. And by the battery voltage recovery effect when the battery voltage exceeds the predetermined voltage, discharging is resumed and is repeatedly carried out until the voltage becomes the predetermined voltage. Accordingly, the battery voltage after discharging becomes stable.

Also, in the above embodiment, two setting values of the discharging current amount are provided. At the first stage is heavy load discharging, at the second stage is light load discharging. Therefore it is possible to control the battery voltage to the predetermined voltage in less time period. More than two setting values of the discharging current amount can be provided.

And, at the mode 2, shifting to charging mode by operation of external input on the electronic timepiece is possible, and after the mode shifting the operation is done in the normal hand operation state. When charging voltage reaches the completion voltage, by changing the hand movement state the notification is made that the charging is done to the predetermined voltage or more. The changing of the hand movement at this time is not limited to the above form, and can be arranged in any other form as long as it is possible to tell the difference of before and after charging completion.

At the mode 2, during charging the battery, there is a false voltage increase. Therefore, even though the voltage once reaches the completion voltage, the battery voltage can decline to the real voltage gradually after completion of the charging. But, in the present embodiment, in the case where the charging voltage once reaches the charging completion voltage if the voltage falls below the charging completion voltage, again the hand movement returns to the normal hand movement. Accordingly, after completion of the charging, by leaving the timepiece until the battery voltage becomes the real voltage and then confirming the hand movement, it is possible to prevent a mis-judgement due to a false voltage increase.

In the above embodiment, if detection is made successively that the motor does not rotate when the normal motor drive pulse is supplied, a drive pulse having bigger effective electric power than the normal driving pulse is supplied. And at the mode 3, if the drive pulse is output successively predetermined times or more, the judgement is made that the motor trouble of not driven by the normal drive pulse occurred. Thus the hand movement is changed, and the notification of the motor trouble is made.

At the mode 3, by operation of external input on the electronic timepiece, the mode is shifted to a poor quality detection mode, and the electronic timepiece is operated in a predetermined hand movement. Therefore, by changing the hand movement state of before and after this shift, it is made possible to easily confirm the mode shift.

And, once the trouble is detected, the hand movement at the trouble detection is continued, therefore it is possible to easily confirm the result of trouble detection.

And at the mode 3, because it is possible to perceive the motor drive trouble by the hand movement, it is made possible to identify the trouble.

Also, it becomes possible to detect that the motor quality is somewhat lower than the satisfying quality but is not bad enough to cause stoppage (time keeping continuation trouble) or delay, both being difficult to detect hitherto. Therefore, quality improvement is expected. Namely, if the motor quality is a bit poor and the detection of the non-rotation is frequently made, the motor will be driven by the auxiliary pulse having bigger effective electric power than the normal driving pulse. Therefore, time delay does not happen. But because of the frequent output of the auxiliary pulse, power consumption rises and remaining operation time shortens. This kind of quality cannot be properly discovered until now due to no time delay, but the mode 3 makes the detection certain.

In the above embodiment, no special check equipment is necessary to conduct the operation check function. Therefore the present invention is easily applicable to the cases of for example advancing to foreign market, or assembling at several regions or places. And even after the shipment for example at the store or at the sales department or the like, it is possible to verify the timepiece operation easily.

Method corresponding to the mode 1 to 3 mentioned above can be solely used, for example following utilizations are possible.

a. Manufacturing and using battery voltage adjusting devices corresponding to the mode 1.

b. Manufacturing and using check devices or full-charge notification devices corresponding to the mode 2.

c. Manufacturing check devices corresponding to both of the mode 1 and 2, and using them for checking of generation unit of analog, digital, or analog-digital combination electrical timepieces.

d. Configuring operation check system corresponding to all of the mode 1, 2, and 3, and using them for operation checking of analog, digital, or analog-digital combination electrical timepieces.

e. Combining the mode 1 and 3, and using for various devices.

f. Combining the mode 2 and 3, and using for various devices.

Also, in the above embodiment, the operation result of each mode (states of discharging or charging or operation check result) is revealed by changing the displaying state (hand movement state) on the time displaying section. But this is not limited to the above form, and other method can be used to reveal the operation result of each mode. For example, if the timepiece has a digital displaying section, it is possible to change the displaying state from the non-displaying state to other state, and thus to enable the notification of the operation result. And if the timepiece has a sound wave generating element or display light, by shifting of sound generation and sound non-generation, by turning the light on/off, by shifting of the sound generation state (frequency, generation cycle, or the like), or by changing the flashing period of the display light, it is possible to notify the charging state or the check result.

The embodiment of the present invention is not limited to the above embodiment. For example, the charging device for the battery is not limited to the provision as an internal unit, but can be provided as a removable unit or as an external unit.

In the above embodiment, a timepiece is exemplified with a generator of an oscillating weight or the like is driven by kinetic energy and the electricity is generated by the rotation from the oscillation weight and then by the electricity the timepiece works. But the present invention is not limited to this. Other generation method is also possible for an electrical timepiece such as seizing light energy with solar panel, such as seizing thermal energy with Peltier element, and such as seizing strain energy with piezo element. Other method is also possible for an electrical timepiece by providing electricity generated by an electromagnetic induction from outside of the timepiece, and then a stepping motor is moved by the electricity. In addition to timepieces, the present invention is applicable to stopwatches and other time keeping apparatus. And the raising and lowering circuit 49 can be omitted. In that case, the circuit driven by the output voltage VSS of the circuit 49 is driven by the output voltage VTKN of the battery 48.

What is claimed is:

1. An electronic timepiece comprising:

an external input unit for receiving an external input signal;

a displaying section for displaying time;

a battery capable of charging;

a drive unit for driving the displaying section using with electrical power stored in the battery;

a comparator unit for comparing voltage stored in the battery with a reference voltage;

a discharge control unit for starting discharge of the battery when an external input signal ordering start of discharge start is input with the external input unit, and for stopping the discharge when comparison result by the comparator unit satisfies a discharge stop condition.

2. An electronic timepiece according to claim 1, wherein the discharge control unit resumes discharge from the battery when the comparison result by the comparator unit becomes unsatisfying to the discharge stop condition.

3. An electronic timepiece according to claim 2, wherein the discharge control unit, when a predetermined external signal is received by the external input unit, starts discharge from the battery in a first discharge method, and when the comparison result by the comparator unit satisfies the discharge stop condition, stops discharge from the battery, and starts discharge from the battery in a second discharge method in which discharge rate is lower than that of the first discharge method.

4. An electronic timepiece according to claim 1, further comprising a discharge unit which forms a closed circuit with the battery, and conducts a discharge current which flows through the closed circuit and lowers voltage stored on the battery.

5. An electronic timepiece according to claim 1, wherein the discharge control unit executes the discharge from the battery by controlling the drive unit to drive the display section.

6. An electronic timepiece according to claim 1, wherein the displaying section comprises an electric motor and a rolling system driven by the electric motor to change display of the displaying section, and, the discharge control unit executes the discharge from the battery by controlling the drive unit to fast-forward the rolling system of the displaying section.

7. An electronic timepiece according to claim 1, further comprising a charging state judge unit for controlling the drive unit to drive the displaying section into a first displaying state when a predetermined external signal is received by the external input unit, and for controlling the drive unit to drive the displaying section into a second displaying state which is different from the first displaying state when comparison result by the comparator unit becomes satisfying to a predetermined condition.

8. An electronic timepiece according to claim 1, wherein the displaying section comprises an electric motor and a rolling system driven by the electric motor and changing display of the displaying section, and the electronic timepiece further comprises:

a charging state judge unit for controlling the drive unit to drive the displaying section into a first displaying state when a predetermined external signal is received by the external input unit, and for controlling the drive unit to drive the displaying section into a second displaying state which is different from the first displaying state when the comparison result by the comparator unit becomes satisfying to a predetermined condition, a trouble detecting unit for detecting a drive trouble of the electric motor, and, a drive trouble judge unit for controlling the drive unit to drive the displaying section into a third displaying state when a predetermined external signal is received by the external input unit, and for controlling the drive unit to drive the displaying section into a fourth displaying state which is different from the third displaying state when a drive trouble is detected by the trouble detecting unit.

9. An electronic timepiece comprising:

an external input unit for receiving an external input signal;

a displaying section for displaying time;

a battery capable of charging;

a drive unit for driving the displaying section by use of electrical power stored in the battery;

a comparator unit for comparing voltage stored on the battery or a voltage corresponding to the voltage with a reference voltage; and a charging state judge unit for controlling the drive unit to drive the displaying section into a first displaying state when a predetermined external signal is received by the external input unit, and for controlling the drive unit to drive the displaying section into a second displaying state which is different from the first displaying state when the comparison result by the comparator unit becomes satisfying to a predetermined condition.

10. An electronic timepiece according to claim 9, wherein the charging state judge unit for controlling the drive unit to drive the displaying section into the first displaying state when the comparison result by the comparator unit becomes satisfying to a predetermined condition and then becomes unsatisfying to the predetermined condition.

11. A check method for an electronic timepiece comprising:

an external input unit for inputting an external input;

a displaying section for displaying time;

a battery capable of charging;

a drive unit for driving the displaying section by use of electrical power stored in the battery;

a comparator unit for comparing a voltage stored on the battery or a voltage corresponding to the voltage with a reference voltage;

a discharge control unit for starting discharge of the battery when a first external input ordering a discharge start is received by the external input unit, and for stopping the discharge from the battery when the comparison result by the comparator unit becomes satisfying to a discharge stop condition; and a charging state judge unit for controlling the drive unit to drive the displaying section into a first displaying state when a second external signal is received by the external input unit, and for controlling the drive unit to drive the displaying section into a second displaying state which is different from the first displaying state when the comparison result by the comparator unit becomes satisfying to a predetermined condition;

the method comprising:

a first step of controlling the voltage stored on the battery by giving the first external input signal from the external input unit and thereby starting the operation of the discharge control unit;

a second step of judging the voltage stored on the battery or a voltage corresponding to the voltage from the displaying state of the displaying section by giving the second external input signal to the external input unit and thereby starting the operation of the charging state judge unit.

12. A check method according to claim 11, wherein the external input unit comprises a first and a second switch for adjusting time on the displaying section, in the first step the first external input signal is generated by operation to the first switch, in the second step the second external input signal is generated by operation to the second switch, and, during or after the second step time is adjusted with the first switch.

13. A check method for an electronic timepiece comprising:

an external input unit for receiving an external input signal;

a displaying section for displaying time, the displaying section including an electric motor and a rolling system driven by the electric motor and changing display of the displaying section;

a battery capable of charging;

a drive unit for driving the motor of the displaying section using with electrical power stored in the battery;

a comparator unit for comparing voltage stored in the battery with a reference voltage;

a discharge control unit for starting discharge of the battery when an external input signal ordering start of discharge start is input with the external input unit, and for stopping the discharge when comparison result by the comparator unit satisfies a discharge stop condition;

a charging state judge unit for controlling the drive unit to drive the displaying section into a first displaying state when a predetermined external signal is received by the external input unit, and for controlling the drive unit to drive the displaying section into a second displaying state which is different from the first displaying state when the comparison result by the comparator unit becomes satisfying to a predetermined condition;

a trouble detecting unit for detecting a drive trouble of the electric motor; and a drive trouble judge unit for controlling the drive unit to drive the displaying section into a third displaying state when a predetermined external signal is received by the external input unit, and for controlling the drive unit to drive the displaying section into a fourth displaying state which is different from the third displaying state when a drive trouble is detected by the trouble detecting unit;

the method comprising the steps of:

a first step of starting the operation of the discharge control unit, and controlling the voltage of the stored electricity of the battery by using an input of a first prescribed external signal as a start condition;

a second step of starting the operation of the charging state judge unit, and controlling the displaying state of the displaying section in accordance with the voltage of the stored electricity of the battery by using an input of a second prescribed external signal as a start condition; and a third step of starting the operation of the drive trouble judge unit, and controlling the displaying state of the displaying section based on the detection result of the drive trouble of the electric motor by using an input of a third prescribed external signal as a start condition.

14. A check method for the electronic timepiece according to claim 13, wherein the external input unit comprises a first and a second switch for adjusting time on the displaying section, the first external input signal is generated by operation to the first switch, the second external input signal is generated by operation to the second switch, and, during or after the second step time is adjusted by the first switch.

15. An electronic timepiece comprising:

an external input unit for receiving an external input signal;

a notification unit for notifying a user;

a battery capable of charging;

a comparator unit for measuring the voltage of the stored electricity in the battery and comparing the voltage with a reference voltage;

a charge state judge unit for controlling a notification state of the notification unit to a first state when a predetermined external signal with the external input unit is input, and for controlling a notification state of the notification unit to a second state which is different from the first notification state when after the first state the battery unit is charged and the comparison result by the comparator unit becomes satisfying to a predetermined condition.

16. An electronic timepiece comprising:

an external input unit for receiving an external input signal;

a notification unit for notifying a user;

a battery capable of charging;

a comparator unit for measuring the voltage of the stored electricity in the battery and comparing the voltage with a reference voltage;

a discharge control unit for starting discharge when a predetermined external input is input with the external input unit, and for stopping discharge from the battery when the comparison result by the comparator unit becomes satisfying to a discharge stop condition; and a charge state judge unit for controlling a notification state of the notification unit to a first state when a predetermined external signal with the external input unit is input, and for controlling a notification state of the notification unit to a second state which is different from the first notification state when after the first state the battery unit is charged and the comparison result by the comparator unit becomes satisfying to a predetermined condition.

17. An electronic timepiece according to claim 16, wherein the charge state judge unit controls a notification state of the notification unit to the first state when the comparison result by the comparator unit becomes satisfying to a predetermined condition, and then becomes unsatisfying to a predetermined condition.

18. An electronic timepiece comprising:

an external input unit for receiving an external input signal;

a notification unit for notifying a user comprising a displaying section with a rolling system by an electric motor;

a battery capable of charging;

a comparator unit for measuring the voltage of the stored electricity in the battery and comparing the voltage with a reference voltage;

a discharge control unit for starting discharge when a predetermined external input is input with the external input unit, and for stopping discharge from the battery when the comparison result by the comparator unit becomes satisfying to a discharge stop condition;

a charge state judge unit for controlling a notification state of the notification unit to a first state when a predetermined external signal with the external input unit is input, and for controlling a notification state of the notification unit to a second state which is different from the first notification state when after the first state the battery unit is charged and the comparison result by the comparator unit becomes satisfying to a predetermined condition;

a trouble detecting unit for detecting a drive trouble of the electric motor; and a drive trouble judge unit for controlling a notification state of the notification unit into a third state when a predetermined external signal is input with the external input unit, and for controlling the notification state of the notification unit into a fourth state which is different from the third state when a drive trouble is detected by the trouble detecting unit.

19. An electronic timepiece comprising:

an external input unit for receiving an external input signal;

a displaying section for displaying time comprising a rolling system by an electric motor;

a notification unit for notifying a user;

a battery;

a trouble detecting unit for detecting a drive trouble of the electric motor; and a drive trouble judge unit for controlling a notification state of the notification unit into a first state when a predetermined external signal is input with the external input unit, and for controlling the notification state of the notification unit into a second state which is different from the first state when a drive trouble is detected by the trouble detecting unit.

20. An electronic timepiece comprising:

an external input unit for inputting an external input signal;

a displaying section for displaying time comprising a rolling system by an electric motor;

a battery;

a drive unit for driving the displaying section by use of electrical power stored in the battery;

a trouble detecting unit for detecting a drive trouble of the electric motor; and a drive trouble judge unit for controlling a display state of the displaying section into a first state when a predetermined external signal is input with the external input unit, and for controlling the display state of the displaying section into a second state which is different from the first state when a drive trouble is detected by the trouble detecting unit.

21. A check method for an electronic timepiece comprising:

an external input unit for receiving an external input signal;

a notification unit for notifying a user;

a battery capable of charging;

a comparator unit for measuring the voltage of the stored electricity in the battery and comparing the voltage with a reference voltage;

a discharge control unit for starting discharge when a predetermined external input is input with the external input unit, and for stopping discharge from the battery when the comparison result by the comparator unit becomes satisfying to a discharge stop condition; and a charge state judge unit for controlling a notification state of the notification unit to a first state when a predetermined external signal with the external input unit is input, and for controlling a notification state of the notification unit to a second state which is different from the first notification state when after the first state the battery unit is charged and the comparison result by the comparator unit becomes satisfying to a predetermined condition;

the method comprising the steps of:

a first step of starting the operation of the discharge control unit, and controlling the voltage of the stored electricity of the battery by using an input of a first prescribed external signal as a start condition; and a second step of starting the operation of the charging state judge unit, and controlling the notification state of the notification unit in accordance with the voltage of the stored electricity of the battery by using an input of a second prescribed external signal as a start condition.

22. A check method for an electronic timepiece comprising:

an external input unit for receiving an external input signal;

a notification unit for notifying a user comprising a displaying section with a rolling system by an electric motor;

a battery capable of charging;

a comparator unit for measuring the voltage of the stored electricity in the battery and comparing the voltage with a reference voltage;

a discharge control unit for starting discharge when a predetermined external input is input with the external input unit, and for stopping discharge from the battery when the comparison result by the comparator unit becomes satisfying to a discharge stop condition;

a charge state judge unit for controlling a notification state of the notification unit to a first state when a predetermined external signal with the external input unit is input, and for controlling a notification state of the notification unit to a second state which is different from the first notification state when after the first state the battery unit is charged and the comparison result by the comparator unit becomes satisfying to a predetermined condition;

a trouble detecting unit for detecting a drive trouble of the electric motor; and a drive trouble judge unit for controlling a notification state of the notification unit into a third state when a predetermined external signal is input with the external input unit, and for controlling the notification state of the notification unit into a fourth state which is different from the third state when a drive trouble is detected by the trouble detecting unit;

the method comprising the steps of:

a first step of starting the operation of the discharge control unit, and controlling the voltage of the stored electricity of the battery by using an input of a first prescribed external signal as a start condition;

a second step of starting the operation of the charging state judge unit, and controlling the notification state of the notification unit in accordance with the voltage of the stored electricity of the battery by using an input of a second prescribed external signal as a start condition; and, a third step of starting the operation of the drive trouble judge unit, and controlling the notification state of the notification unit based on the detection result of the drive trouble of the electric motor by using an input of a third prescribed external signal as a start condition.

23. An electronic timepiece comprising:

an external input unit for receiving an external input signal;

a notification unit for notifying a user of prescribed information including time comprising a displaying section with a rolling system by an electric motor;

a battery capable of charging;

a drive unit for driving the notification unit by use of electrical power stored in the battery;

a comparator unit for comparing voltage of the stored electricity in the battery with a reference voltage;

a discharge control unit for starting discharge when a predetermined external input is input with the external input unit, and for stopping discharge from the battery when the comparison result by the comparator unit becomes satisfying to a discharge stop condition;

a trouble detecting unit for detecting a drive trouble of the electric motor; and a drive trouble judge unit for controlling a notification state of the notification unit into a first state when a predetermined external signal is input with the external input unit, and for controlling the notification state of the notification unit into a second state which is different from the first state when a drive trouble is detected by the trouble detecting unit.

24. An electronic timepiece comprising:

an external input unit for receiving an external input signal;

a notification unit for notifying a user of prescribed information including time comprising a displaying section with a rolling system by an electric motor;

a battery capable of charging;

a drive unit for driving the notification unit by use of electrical power stored in the battery;

a comparator unit for comparing voltage of the stored electricity in the battery with a reference voltage;

a charge state judge unit for controlling a notification state of the notification unit to a first state when a predetermined external signal with the external input unit is input, and for controlling a notification state of the notification unit to a second state which is different from the first notification state when after the first state the battery unit is charged and the comparison result by the comparator unit becomes satisfying to a predetermined condition;

a trouble detecting unit for detecting a drive trouble of the electric motor; and a drive trouble judge unit for controlling a notification state of the notification unit into a third state when a predetermined external signal is input with the external input unit, and for controlling the notification state of the notification unit into a fourth state which is different from the third state when a drive trouble is detected by the trouble detecting unit.

* * * * *